(12) United States Patent
Kobayashi et al.

(10) Patent No.: US 6,384,814 B1
(45) Date of Patent: *May 7, 2002

(54) INPUT PEN

(75) Inventors: Katsuyuki Kobayashi, Yokohama; Atsushi Tanaka, Yamato; Yuichiro Yoshimura, Kamakura; Ryozo Yanagisawa, Inzai; Hajime Sato, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/248,108

(22) Filed: Feb. 11, 1999

(30) Foreign Application Priority Data

Feb. 16, 1998 (JP) .............................. 10-033373
Mar. 5, 1998 (JP) .............................. 10-053730

(51) Int. Cl.$^7$ ................................. G09G 5/00
(52) U.S. Cl. .................. 345/179; 345/173; 702/56; 702/95
(58) Field of Search ............... 345/173, 179, 345/169; 702/95, 56; 528/272

(56) References Cited

U.S. PATENT DOCUMENTS

| | | | | |
|---|---|---|---|---|
| 5,096,322 A | * | 3/1992 | Shiga et al. | 401/199 |
| 5,484,967 A | | 1/1996 | Yanagisawa et al. | |
| 5,684,277 A | | 11/1997 | Tokioka et al. | |
| 5,744,760 A | | 4/1998 | Kobayashi et al. | |
| 5,748,182 A | * | 5/1998 | Ohashi et al. | 345/173 |
| 5,842,153 A | * | 11/1998 | Kobayashi et al. | 702/95 |
| 5,914,708 A | * | 6/1999 | LaGrange et al. | 345/179 |
| 6,041,284 A | * | 3/2000 | Yoshimura et al. | 702/56 |
| 6,075,114 A | * | 6/2000 | Umetsu et al. | 528/272 |

FOREIGN PATENT DOCUMENTS

| | | |
|---|---|---|
| JP | 1-114924 | 5/1989 |
| JP | 6-119102 | 4/1994 |

* cited by examiner

Primary Examiner—Steven Saras
Assistant Examiner—Alecia D. Nelson
(74) Attorney, Agent, or Firm—Fitzpatrick, Cella, Harper & Scinto

(57) ABSTRACT

An input pen includes a vibration generating element for generating a vibration, a vibration transmitting member for transmitting the vibration generated by the vibration generating element, and a pen tip member attached to a point of the vibration transmitting member and made of a material having viscoelasticity.

23 Claims, 18 Drawing Sheets

F I G. 9
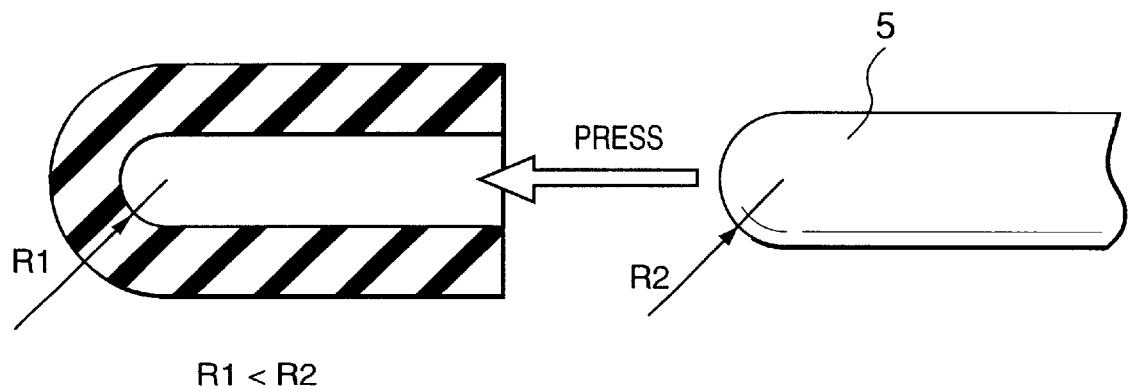
R1 < R2
F I G. 10
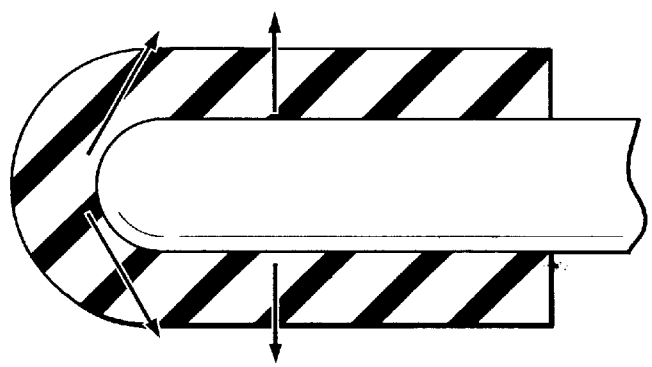

R1 < R2

INPUT PEN

BACKGROUND OF THE INVENTION

1. Field of the Invention

The present invention relates to an input pen for a coordinate input apparatus for determining an input position on the basis of a vibration propagating on a vibration transmitting plate.

2. Description of the Related Art

Conventionally known coordinate input apparatuses detect an input elastic wave vibration from an input pen by a plurality of sensors and thereby detect coordinates indicated by the input pen. For example, the pen tip of an input pen for a coordinate input apparatus described in Japanese Patent Laid-Open No. 1-114924 is constructed of polyamidoimide as a resin and:

(1) has high resistance to wear caused by, e.g., friction when coordinates are input; and (2) can efficiently transmit vibrations generated inside the input pen without any decay.

Since the pen tip of the input pen of the above conventional coordinate input apparatus is made of polyamidoimide as a resin, it is expected that mass-production by molding is possible. However, the molded pen tip of the input pen has the following problems.

When the input pen incorporating the molded pen tip vertically abuts against a vibration transmitting plate and the input pen is rotated around its axis, a signal waveform detected by sensors changes. That is, when an input vibration from the input pen concentrically propagates in the form of a wave from the input point on the vibration transmitting plate, the detected signal waveform changes in accordance with the direction of the input pen. This phenomenon is called directivity and has a harmful influence as follows.

The basic principle of the conventional coordinate input apparatus is to calculate a distance by using the transmission time and ultrasonic velocity of acoustic wave. It is desirable that not only the ultrasonic wave be constant in a propagating body and the signal waveform to be detected by sensors be always the same. That is, as shown in FIG. 7, even when a vibration is input from a single point, detected propagation times are different if different signal waveforms are detected. Referring to FIG. 7, a vibration is input from a single point, so the same value is supposed to be detected at propagation delay time 1 and propagation delay time 2. However, if the waveform changes for some reason, different values are detected. As a consequence, the coordinate input apparatus causes detection error, i.e., the apparatus operates as if input vibrations from different points were detected. This decreases the accuracy of the coordinate input apparatus. To realize a reliable coordinate input apparatus, therefore, a construction always capable of detecting the same signal waveform is necessary.

As described above, the directivity of an input pen decreases the coordinate calculation accuracy of a coordinate input apparatus of this sort. To realize a coordinate input apparatus with high accuracy and high reliability, some countermeasure is necessary.

Additionally, the ability to transmit vibrations is an essential specification of an input pen of the above sort, so a resin as a relatively hard material is chosen. However, this property of being "hard" has the following harmful influence from the user's viewpoint. That is, a coordinate input surface transmits input vibrations from an input pen to vibration detecting elements, so glass or a metal such as aluminum is chosen as the material. Accordingly, when a user inputs coordinates by using this input pen, the input pen makes the user feel a kind of "hardness", and this degrades the operability during coordinate input. For example, a user easily becomes tired when he or she uses the input pen for hours.

Another problem is that the pen tip of an input pen of a coordinate input apparatus of this sort constantly wears when an operator writes with the pen. Although the durability can be improved by the use of a resin with high wear resistance, the pen tip wears anyway after long use. Therefore, the pen tip is desirably replaceable. A construction as disclosed in Japanese Patent Laid-Open No. 06-119102 is one such prior art. The problem of this construction is the loss of ultrasonic wave transmitted from a vibration transmitting member to a pen tip. That is, in this prior art, the energy of passing ultrasonic wave can be held constant only when the screw fastening torque (this relates to the contact force between the vibration transmitting member and the contact surface of the pen tip) is controlled. Strictly speaking, if no satisfactory screw fastening torque is obtained, vibrations cannot be transmitted to the pen tip any longer, so no coordinates can be input. Specifications requiring a user to control the screw fastening torque decrease the degree of customer's satisfaction. To solve this problem, a pen tip has been proposed by which the contact force between the vibration transmitting member and the contact surface of the pen tip is held constant even when a user replaces one pen tip with another. However, this prior art requires a construction always capable of obtaining stable vibrations even when a user replaces one pen tip with another, resulting in high manufacturing cost.

SUMMARY OF THE INVENTION

It is an object of the present invention to provide an input pen for a coordinate input apparatus, which can improve the operability and reduce the directivity of the input pen and can be readily replaced with another.

To achieve the above object, an input pen according to the present invention has the following constructions.

An input pen for a coordinate input apparatus for determining an input position on the basis of a vibration propagating on a vibration transmitting plate, comprises a vibration generating element for generating a vibration, a vibration transmitting member for transmitting the vibration generated by the vibration generating element, and a pen tip member attached to a point of the vibration transmitting member and made of a material having viscoelasticity.

The material having viscoelasticity is preferably acrylonitrilebutadiene rubber.

The material having viscoelasticity is preferably one material selected from the group consisting of rubber materials such as chloroprene rubber and butyl rubber, elastomers such as styrene-, olefin-, urethane-, polyester-, polyamide-, and vinyl chloride-based elastomers and a combination thereof.

Preferably, the vibration transmitting member has a semispherical point, the pen tip member has a semispherical cavity bottom, and a radius of the cavity bottom is smaller than a radius of the point.

The surface of the pen tip member is preferably so treated as to decrease frictional resistance against the vibration transmitting plate.

The thickness of the pen tip member is preferably 0.5 to 2 mm.

Preferably, the vibration transmitting member has a plane point, the pen tip member has a plane cavity bottom, and a radius of the cavity bottom is smaller than a radius of the point.

Preferably, the vibration transmitting member has a spherical point, the pen tip member has a spherical cavity bottom, and a radius of the cavity bottom is smaller than a radius of the point.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is an enlarged view showing the tip of the vibration input pen according to the first embodiment of the present invention;

FIG. 10 is a view showing the way the tip is attached to the vibration input pen according to the first embodiment of the present invention;

DETAILED DESCRIPTION OF THE PREFERRED EMBODIMENTS

Preferred embodiments of the present invention will be described in detail below with reference to the accompanying drawings.

First, an overall arrangement of a coordinate input apparatus using a vibration input pen of the present invention will be described below with reference to FIG. 1.
<<First Embodiment>>
<Description of Coordinate Input Apparatus (FIG. 1)>

Figure 1:
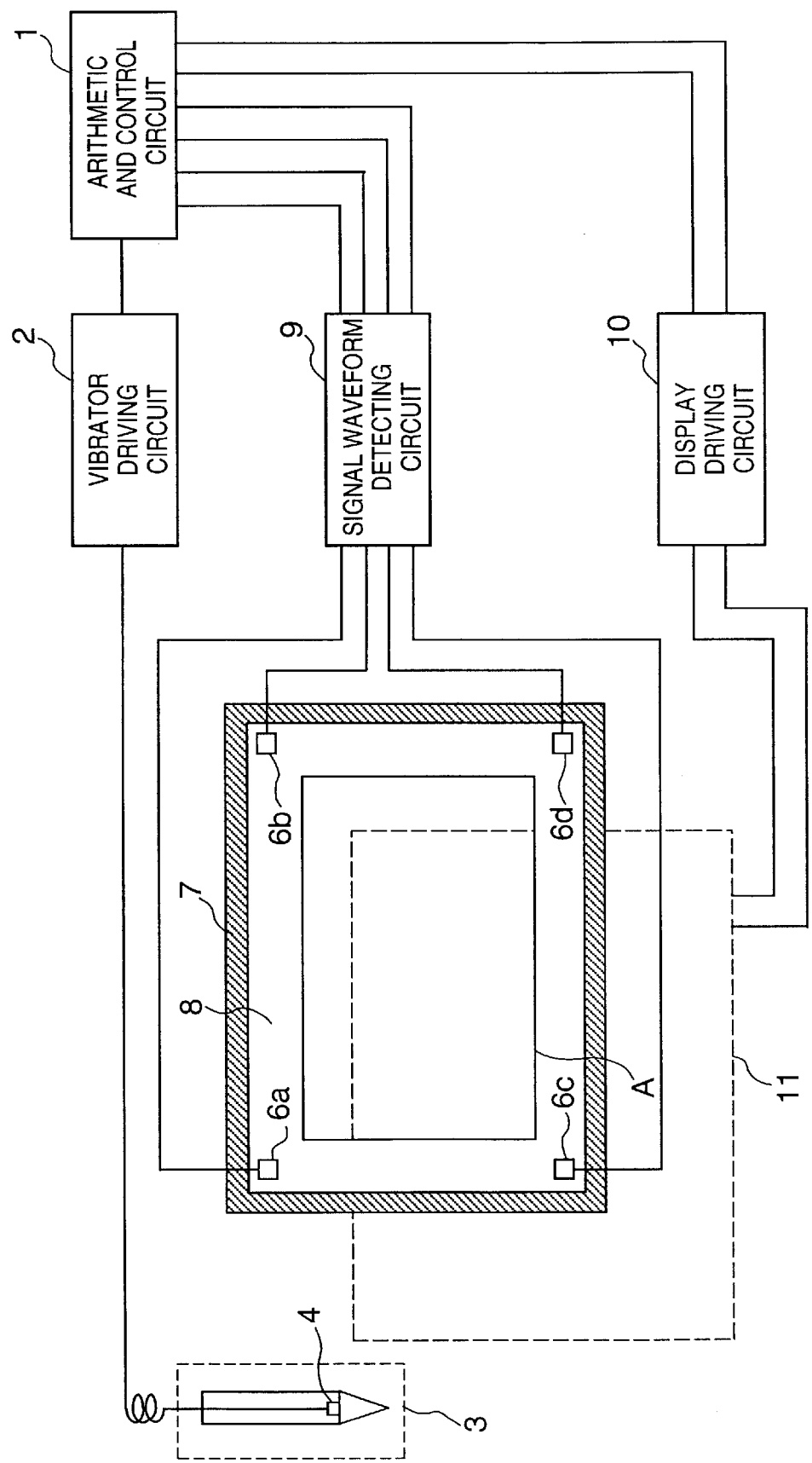
FIG. 1 is block diagram showing the arrangement of a coordinate input apparatus according to the first embodiment of the present invention.

FIG. 1 is a block diagram showing the arrangement of a coordinate input apparatus according to the first embodiment of the present invention.

Referring to FIG. 1, an arithmetic and control circuit 1 controls the whole apparatus and also calculates a coordinate position. A vibrator driving circuit 2 vibrates a built-in vibrator 4 of a vibration input pen 3. Vibrations generated by the vibrator 4 are applied to a vibration transmitting plate 8 via a vibration transmitting member 5 and a pen tip 12.

The vibration transmitting plate 8 is made of a transparent member such as an acrylic or glass plate. Coordinate input by the vibration input pen 3 is performed by touching a coordinate input effective area (a region A indicated by the solid lines in FIG. 1: to be referred to as an effective area hereinafter) on the vibration transmitting plate 8. A vibroisolating member 7 is formed on the outer circumference of the vibration transmitting member 8. This vibroisolating member 7 prevents input vibrations from the vibration input pen 3 from being reflected by the end faces of the vibration transmitting member 8 and returning to the center of the vibration transmitting member 8 (i.e. the member 7 attenuates the reflected wave).

Vibration sensors 6a to 6d such as a piezoelectric element or the like, are fixed in the peripheral portion of the vibration transmitting plate 8 to convert mechanical vibrations into electrical signals. Signals from the vibration sensors 6a to 6d are amplified by an amplifier circuit (not shown) and supplied to a signal waveform detecting circuit 9. The signal waveform detecting circuit 9 processes the signals and outputs the processing result to the arithmetic and control circuit 1 which calculates coordinates. Details of the signal waveform detecting circuit 9 and the arithmetic and control circuit 1 will be described later.

A display 11 such as a liquid crystal display is placed behind the vibration transmitting plate 8 and can display a position in units of dots. This display 11 is driven by a display driving circuit 10 to display dots in positions traced by the vibration input pen 3. An operator can see these dots through the vibration transmitting plate 8 (when the vibration transmitting plate 8 is made of a transparent material such as glass).

The built-in vibrator 4 of the vibration input pen 3 is driven by the vibrator driving circuit 2. An electrical driving signal for the vibrator 4 is supplied as a low-level pulse signal from the arithmetic and control circuit 1. The vibrator driving circuit 2 amplifies this electrical driving signal with a predetermined gain and applies the signal to the vibrator 4. The vibrator 4 converts the electrical driving signal into a mechanical ultrasonic vibration and transmits the vibration to the vibration transmitting plate 8 via the pen tip 12. The vibrator driving circuit 2 can also be built into the vibration input pen 3 or mounted on a main body control board.

A value by which lamb waves can be generated on the vibration transmitting plate 8 is selected as the vibration frequency of the vibrator 4. Efficient vibration conversion is possible when this vibration frequency of the vibrator 4 is a resonance frequency of the vibration transmitting member 5 and the pen tip 12. Additionally, the detection wave of the vibration input pen 3 of the present invention is not limited to the lamb wave. For example, when a surface wave propagating on the vibration transmitting plate 8 is used as the detection wave, the frequency of vibrations generated by the vibration input pen 3 is set to a value much larger than the thickness of the vibration transmitting plate 8 (i.e., the frequency is so set that a wavelength A of the wave propagating on the vibration transmitting plate 8 is much smaller than the plate thickness). Even in this case, the structure of the vibration input pen 3 of the present invention can be an effective means.

Details of the arithmetic and control circuit 1 will be described below with reference to FIG. 2.

<Description of Arithmetic and Control Circuit (FIG. 2)>

In the above arrangement, the arithmetic and control circuit 1 outputs a signal for driving the vibrator 4 in the vibration input pen 3 to the vibrator driving circuit 2 every predetermined period (e.g., 5 ms) and causes an internal timer (counter) to start counting. A vibration generated by the vibration input pen 3 arrives at the vibration sensors 6a to 6d with delays corresponding to the distances to these sensors.

The signal waveform detecting circuit 9 detects signals from the vibration sensors 6a to 6d and generates signals indicating the timings at which the vibration arrives at the vibration sensors 6a to 6d by a waveform detecting process (to be described later) The arithmetic and control circuit 1 receives these timing signals corresponding to the vibration sensors 6a to 6d and detects the times at which the vibration arrives at the vibration sensors 6a to 6d. On the basis of the detected vibration arrival times, the arithmetic and control circuit 1 calculates the coordinate position of the vibration input pen 3. Also, on the basis of this calculated coordinate position of the vibration input pen 3, the arithmetic and control circuit 1 drives the display driving circuit 10 to control display by the display 11 or outputs the coordinates to an external apparatus (not shown) by serial or parallel communication.

Figure 2:
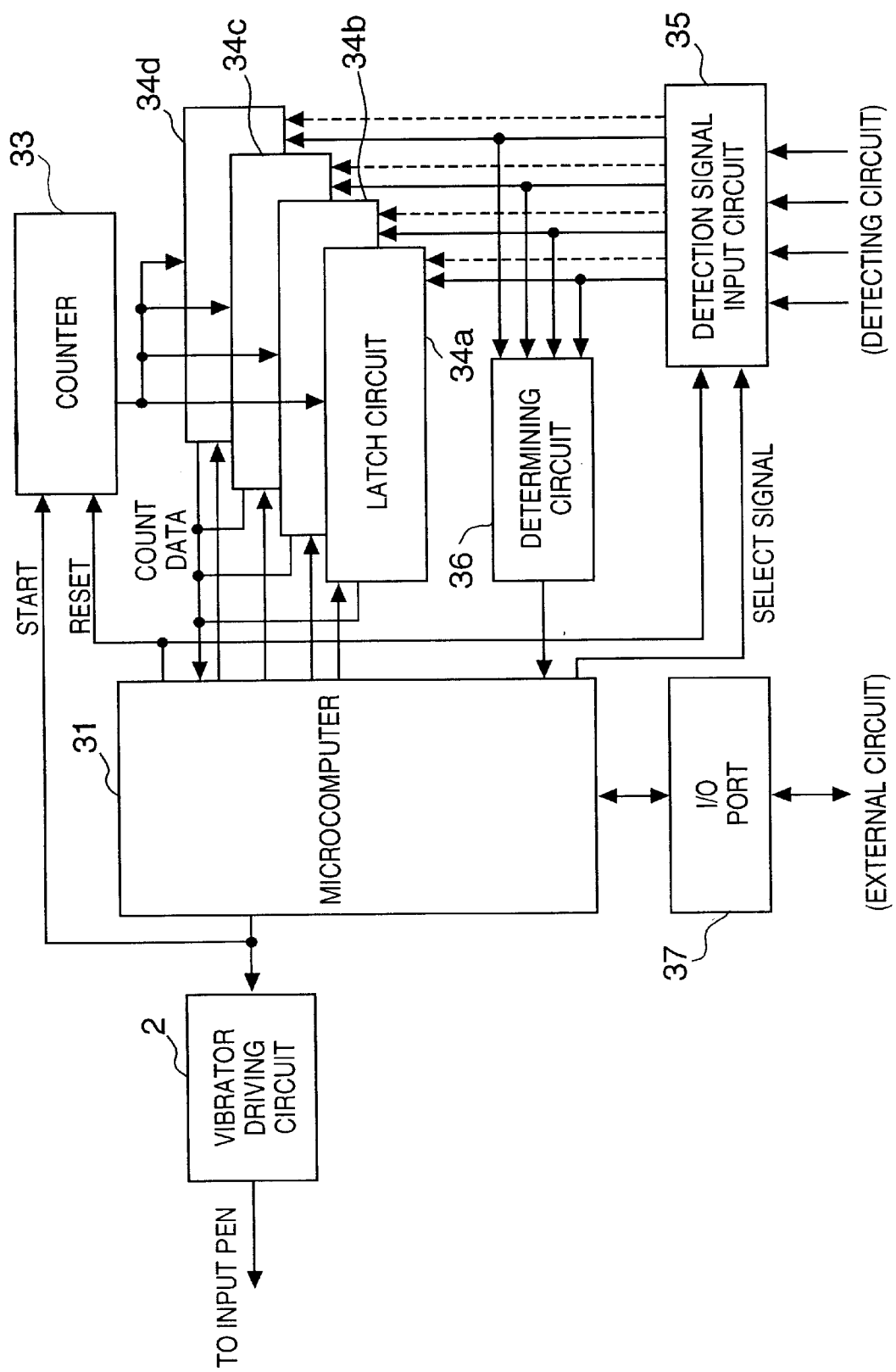
FIG. 2 is a block diagram showing details of the arrangement of an arithmetic and control circuit of the first embodiment of the present invention.

FIG. 2 is a block diagram showing details of the arrangement of the arithmetic and control circuit 1 according to the first embodiment of the present invention.

Referring to FIG. 2, a microcomputer 31 controls the arithmetic and control circuit 1 and the entire coordinate input apparatus. This microcomputer 31 includes an internal counter, ROM storing operation procedures, RAM to be used in calculations, and nonvolatile memory storing constants and the like. A timer (e.g., a counter) 33 counts reference clocks (not shown). When a start signal for starting vibration of the vibrator 4 in the vibration input pen 3 is input to the vibrator driving circuit 2, the timer 33 starts counting.

The vibration arrival timing signals output from the signal waveform detecting circuit 9 in a one-to-one correspondence with the vibration sensors 6a to 6d are input to latch circuits 34a to 34d via a detection signal input port 35. These latch circuits 34a, 34b, 34c, and 34d correspond to the vibration sensors 6a, 6b, 6c, and 6d, respectively. Upon receiving the vibration arrival timing signal of the corresponding vibration sensor, each latch circuit latches the count of the timer 33 at that point (accordingly, a delay time until each of the vibration sensors 6a to 6d detects the input vibration from the vibration input pen 3 can be measured). When a determining circuit 36 determines that the vibration arrival timing signals of the vibration sensors 6a to 6d are received, the determining circuit 36 outputs a signal indicating this information to the microcomputer 31.

Upon receiving this signal from the determining circuit 36, the microcomputer 31 reads the vibration arrival times of the vibration sensors 6a to 6d from the latch circuits 34a to 34d. On the basis of the read vibration arrival times, the microcomputer 31 performs predetermined calculations to calculate the coordinate position of the vibration input pen 3 on the vibration transmitting plate 8. The microcomputer 31 can display a dot in a corresponding position on the display 11 by outputting information about the calculated coordinate position to the display driving circuit 10 via an I/O port 37. Alternatively, the microcomputer 31 can output the coordinate values to an external apparatus by outputting the coordinate position information to an interface circuit via the I/O port 37.

A process of detecting the vibration arrival time and details of the arrangement of the signal waveform detecting circuit 9 will be described below with reference to FIGS. 3 and 4.

<Description of Vibration Propagation Time Detection (FIGS. 3 and 4)>

Figure 3:
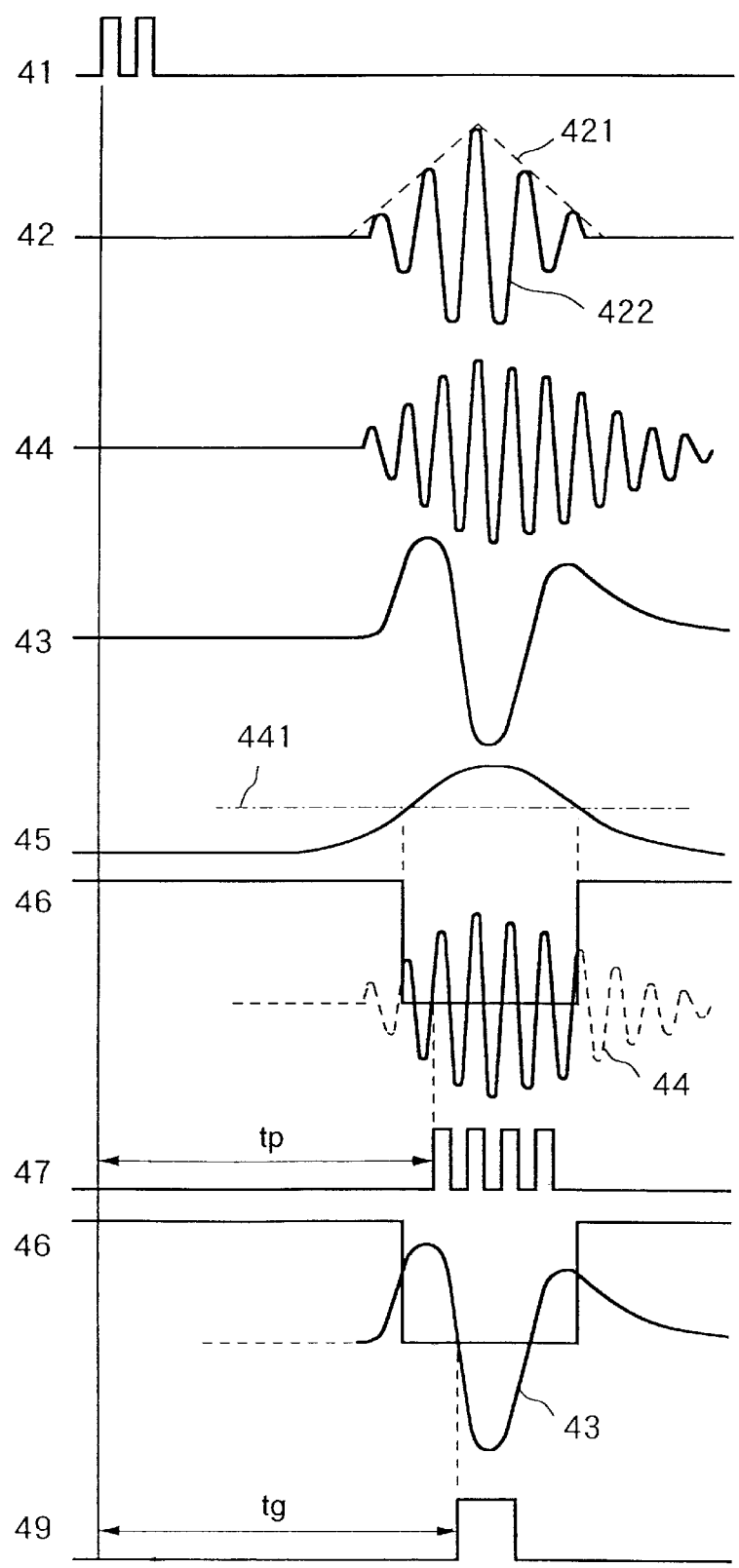
FIG. 3 is a timing chart for explaining an input detection waveform to a signal waveform detecting circuit of the first embodiment of the present invention and a process of measuring the vibration transmission time on the basis of this waveform.

FIG. 3 is a timing chart for explaining an input detection waveform to the signal waveform detecting circuit according to the first embodiment of the present invention and a process of measuring the vibration transmission time on the basis of this waveform.

The operation will be described by taking the vibration sensor 6a as an example. However, the operation is exactly the same as for the other vibration sensors 6b, 6c, and 6d, so a detailed description thereof will be omitted.

As already described above, the measurement of the vibration transmission time to the vibration sensor 6a is started at the same time the start signal is output to the vibrator driving circuit 2. At this time, the vibrator driving circuit 2 applies a driving signal 41 to the vibrator 4. An ultrasonic vibration transmitted from the vibration input pen 3 to the vibration transmitting plate 8 by this driving signal 41 travels for a time corresponding to the distance to the vibration sensor 6a and is detected by the vibration sensor 6a. A signal 42 shown in FIG. 3 indicates the signal waveform detected by the vibration sensor 6a.

Vibrations used in the first embodiment are lamb waves as described earlier. Hence, a velocity (group velocity Vg) at which an envelope 421 of the detection waveform propagates differs from a velocity (phase velocity Vp) at which a phase 422 of the waveform propagates. Accordingly, the relationship between the envelope 421 and the phase 422 of the detection waveform changes in accordance with the transmission distance on the vibration transmitting plate 8. In the first embodiment, the distance between the vibration input pen 3 and the vibration sensor 6a is detected from a group delay time tg based on the group velocity Vg and a phase delay time tp based on the phase velocity Vp.

Figure 4:
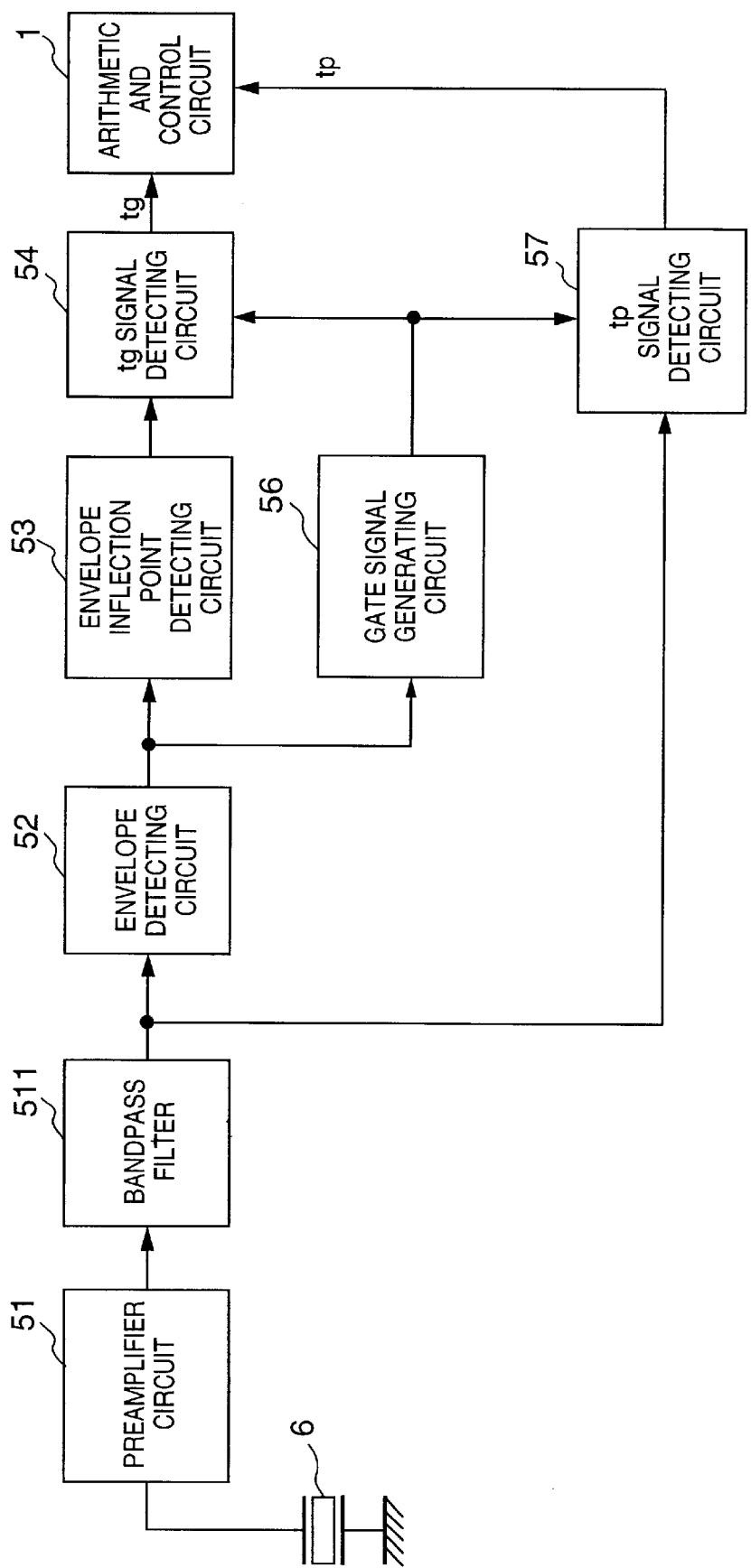
FIG. 4 is a block diagram showing details of the arrangement of a signal waveform detecting circuit according to the first embodiment of the present invention.

FIG. 4 is a block diagram showing details of the arrangement of the signal waveform detecting circuit 9 according to the first embodiment of the present invention.

A process of detecting the group delay time tg and the phase delay time tp will be described below with reference to FIG. 3.

A preamplifier circuit 51 amplifies the output signal 42 from the vibration sensor 6a to a predetermined level. A bandpass filter 511 removes unnecessary frequency components from the amplified detection signal to obtain a signal 44. An ultrasonic velocity at which the waveform of this signal 44 propagates is the group velocity Vg. The delay time tg pertaining to the group velocity Vg is obtained by detecting a certain specific point on the waveform, e.g., the peak or an inflection point of the envelope. Therefore, the signal amplified by the preamplifier circuit 51 and passed through the bandpass filter 511 is input to an envelope detecting circuit 52 constructed of, e.g., an absolute value circuit and low-pass filter. The envelope detecting circuit 52 extracts only an envelope 45 of the detection signal. Additionally, a gate signal generating circuit 56 constructed of, e.g., a multivibrator generates agate signal 46 corresponding to a portion of the envelope 45 exceeding a preset threshold level 441.

To detect the group delay time tg pertaining to the group velocity Vg, it is only necessary to detect the peak or an inflection point of the envelope as described above. In this embodiment, the first inflection point (the zero-crossing point of the trailing edge of a signal 43 (to be described below)) of the envelope is detected. The output signal 45 from the envelope detecting circuit 52 is input to an envelope inflection point detecting circuit 53 where the two-time differential waveform signal 43 of the envelope is obtained. A tg signal detecting circuit 54 constructed of, e.g., a multivibrator compares this two-time differential waveform signal 43 with the gate signal 46 and generates a tg signal 49 as an envelope delay time detection signal with a predetermined waveform. This tg signal 49 is input to the arithmetic and control circuit 1.

Reference numeral 57 denotes a tp signal detecting circuit constructed of, e.g., a zero-crossing comparator and multivibrator and used to detect the phase delay time tp pertaining to the phase velocity Vp. The tp signal detecting circuit 57 detects the zero-crossing point of the first leading edge of the phase signal 44 while the gate signal 46 is open, and supplies a signal 47 of the phase delay time tp to the arithmetic and control circuit 1.

The above description relates to the vibration sensor 6a. However, it is also possible to use identical circuits for the other vibration sensors 6b to 6d or share the circuits by time-divisionally selecting the sensors by using an analog switch or the like.

A method of calculating the distances from the vibration input pen 3 to the vibration sensors 6a to 6d will be described below with reference to FIG. 5.

<Description of Calculations of Distances Between Vibration Input Pen and Sensors (FIG. 5)>

A method of calculating the distances from the vibration input pen 3 to the vibration sensors 6a to 6d on the basis of the group delay time tg and the phase delay time tp obtained as described above will be described.

Figure 5:
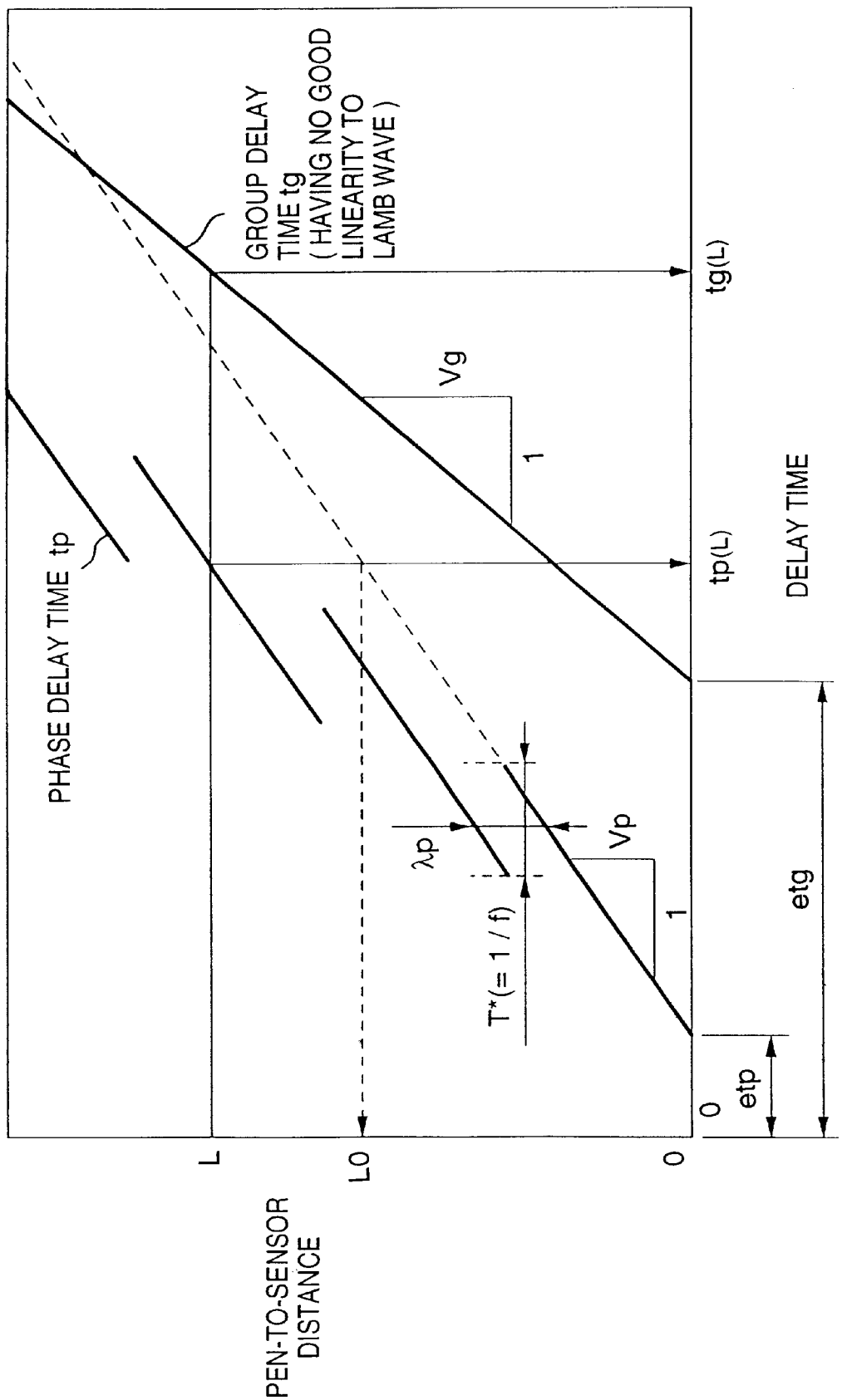
FIG. 5 is a graph showing the relationship between a group delay time tg, a phase delay time tp, and a pen-to-sensor distance L in the first embodiment of the present invention.

FIG. 5 is a graph showing the relationship between the group delay time tg, the phase delay time tp, and a pen-to-sensor distance L in the first embodiment of the present invention.

Since a lamb wave is used as a detection wave in the first embodiment, the group delay time tg does not have good linearity. Accordingly, the distance L between the vibration input pen 3 and the vibration sensor 6a cannot be accurately calculated when calculated as the product of the group delay time tg and the group velocity Vp by $$L = Vg \cdot tg \quad (1)$$

To determine coordinates more accurately, therefore, arithmetic processing is performed on the basis of the phase delay time tp with better linearity by $$L = Vp \cdot tp + n \cdot \lambda p \quad (2)$$

where $\lambda p$ is the wavelength of an elastic wave and n is an integer. The first term on the right side of equation (2) indicates a distance L0 shown in FIG. 5. As is apparent from FIG. 5, the difference between the distance L to be calculated and the distance L0 is an integral multiple of the wavelength (a width T* of a staircase is one period of the signal waveform 44 on the time base, i.e., T*=1/frequency, and is the wavelength $\lambda p$ when represented by the distance). Therefore, the distance L between the vibration input pen 3 and the vibration sensor 6a can be accurately calculated by calculating the integer n. This integer n can be calculated from equations (1) and (2) described above by $$n = \text{int}[(Vg \cdot tg - Vp \cdot tp)/\lambda p + \tfrac{1}{2}] \quad (3)$$

The integer n is calculated by equation (3) because a lamb wave is used as a detection wave, so the group delay time tg is not well linear with respect to the distance. Equation (5) derived from equation (4) indicates a necessary and sufficient condition under which an accurate integer N is calculated.

$$n^* = (Vg \cdot tg - Vp \cdot tp)/\lambda p \quad (4)$$

$$\Delta N = n^* - n \leq 0.5 \quad (5)$$

That is, if a generated error is within the range of ±½ wavelength, the integer n can be accurately determined although the group delay time tg has no good linearity. By substituting n calculated as above into equation (2), the distance L between the vibration input pen 3 and the vibration sensor 6a can be measured with high accuracy.

This equation relates to the vibration sensor 6a. However, the distances between the vibration input pen 3 and the other vibration sensors 6b to 6d can be similarly calculated by the same equation.

A method of correcting circuit delay times will be described below with reference to FIGS. 5 and 6.

<Description of Circuit Delay Time Correction>

The vibration transmission times tg and tp latched by the latch circuits 34a to 34d contain a phase circuit delay time etp and a group circuit delay time etg (see FIG. 5; these times further contain, e.g., a time during which a vibration propagates in the pen tip 12 of the vibration input pen 3 in addition to the circuit delay time). The same amount of error is always produced by these delay times when a vibration is transmitted from the vibration input pen 3 to the vibration sensors 6a to 6d via the vibration transmitting plate 8.

Figure 6:
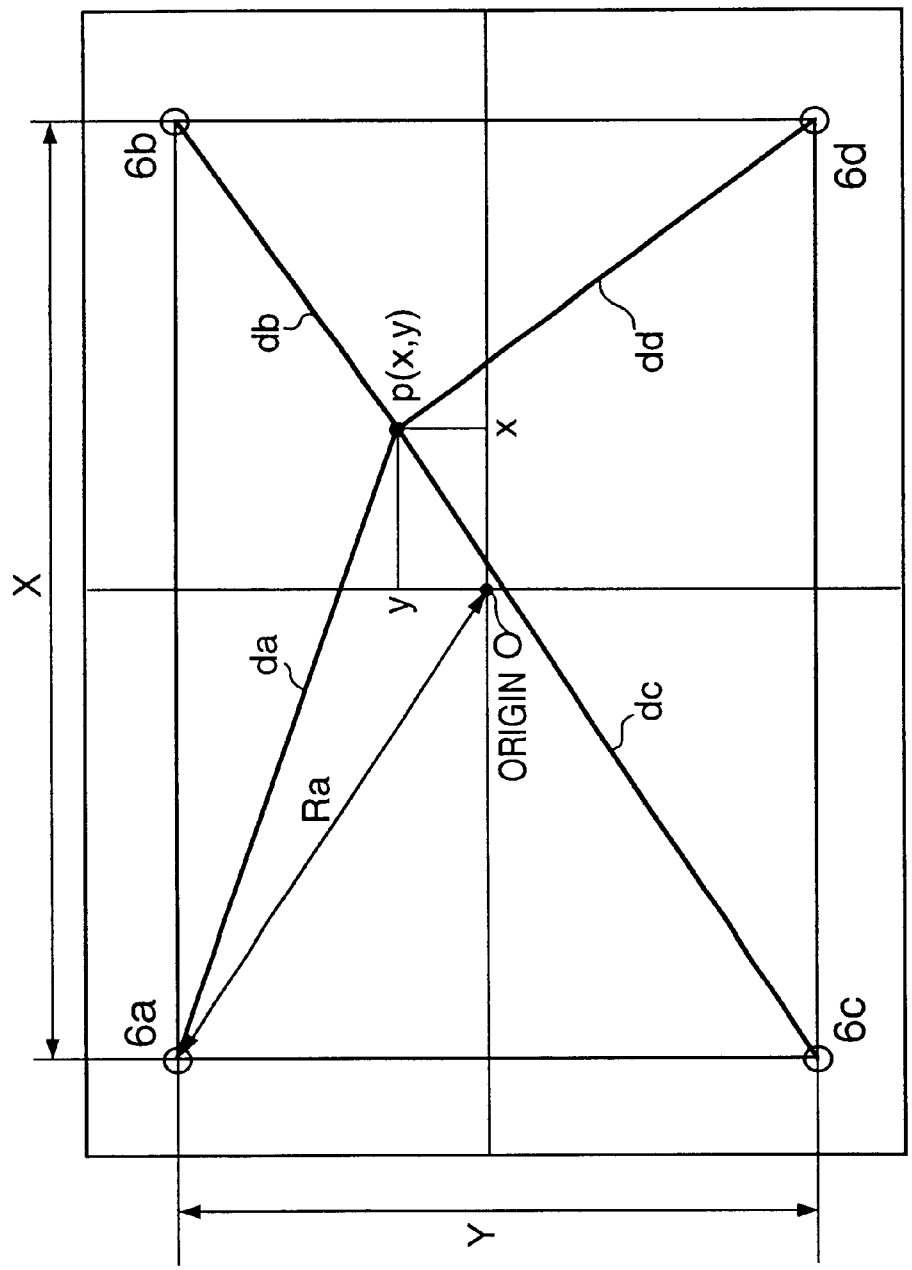
FIG. 6 is a view for explaining the principle of coordinate position detection in the first embodiment of the present invention.
Figure 7:
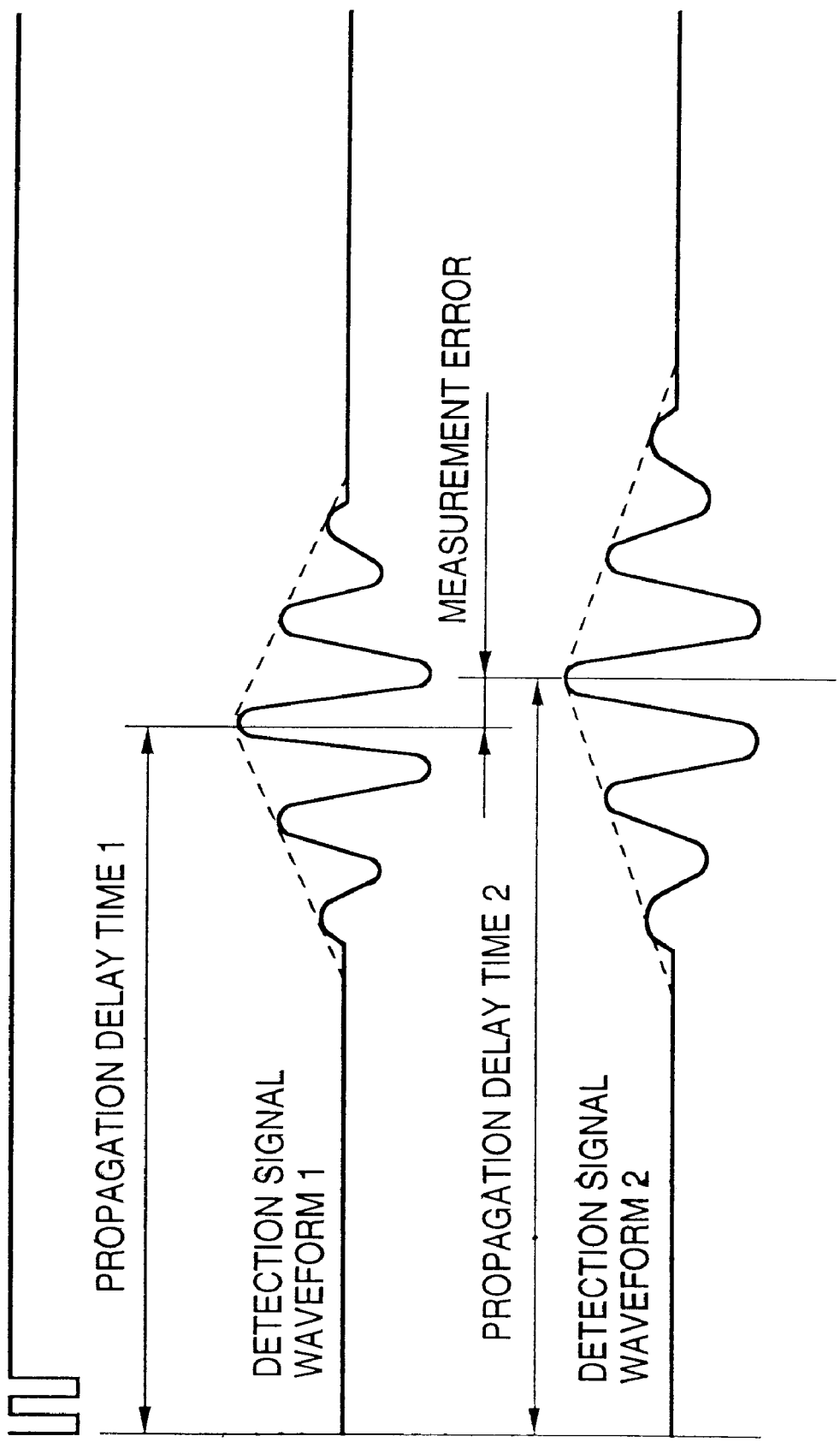
FIG. 7 is a view for explaining the problem.

For example, let Ra (=sqr{(X/2)2+(Y/2)2}, FIG. 6) be the distance from an origin O shown in FIG. 6 to the vibration sensor 6a. Also, letting tg0* and tp0* be vibration transmission times actually measured when a vibration input in the origin O by the vibration input pen 3 arrives at the vibration sensor 6a, and tg0 and tp0 be transmission times required by a lamb wave to actually propagate on the vibration transmitting plate 8 from the origin O to the vibration sensor 6a, $$tg0^* = tg0 + etg \quad (6)$$

$$tp0^* = tp0 + etp \quad (7)$$

Analogously, actually measured values tg* and tp* at a given input point P are $$tg^* = tg + etg \quad (8)$$

$$tp^* = tp + etp \quad (9)$$

The difference between equations (6) and (8) and the difference between equations (7) and (9) are $$tg^* - tg0^* = (tg + etg) - (tg0 + etg) = tg - tg0 \quad (10)$$

$$tp^* - tp0^* = (tp + etp) - (tp0 + etp) = tp - tp0 \quad (11)$$

Consequently, the phase circuit delay time etp and the group circuit delay time etg contained in each transmission time are eliminated, and an accurate time difference between the time during which a wave propagates the distance Ra and the time during which the wave propagates the distance da can be calculated. Accordingly, the difference between the distances Ra and da can be calculated by using equations (1), (2), and (3). That is, the distance is calculated by substituting $$tg = tg^* - tg0^* \quad (12)$$

$$tp = tp^* - tp0^* \quad (13)$$

into equations (1), (2), and (3), and the distance Ra from the vibration sensor 6a to the origin O is added to the calculated value. In this manner, the distance from the vibration input pen 3 to the vibration sensor 6a can be accurately calculated. Therefore, the distance between the vibration input pen 3 and the vibration sensor 6a can be determined by prestoring the distance Ra from the vibration sensor 6a to the origin O and the times tg0* and tp0* measured at the origin O into a storage medium such as a nonvolatile memory. The distances to the other vibration sensors 6b to 6d can also be calculated following the same procedure.

The principle of calculations of a coordinate position input by the vibration input pen 3 on the vibration transmitting plate 8 will be described below with reference to FIG. 6.

<Description of Coordinate Position Calculation>

FIG. 6 is a view for explaining the principle of coordinate position detection in the first embodiment of the present invention.

As shown in FIG. 6, when the four sensors 6a to 6d are positioned in the four corners of the vibration transmitting plate 8, straight distances da to dd from a position P of the vibration input pen 3 to the vibration sensors 6a to 6d can be calculated following the same procedure as described above. On the basis of these straight distances da to dd, the arithmetic and control circuit 1 can calculate coordinates (x,y) of the position P of the vibration input pen 3 from the theorem of three squares by $$x = (da + db) \cdot (da - db)/2X \quad (14)$$

$$y = (da + dc) \cdot (da - dc)/2Y \quad (15)$$

where X is the distance between the vibration sensors 6a and 6b and Y is the distance between the vibration sensors 6a and 6c. In this way, the position coordinates of the vibration input pen 3 can be detected in real time.

The above calculations are performed by using the distances to three sensors. However, the four vibration sensors 6a to 6d are installed in this embodiment, so it is possible to calculate the coordinates of the vibration input pen 3 by using the distances to three vibration sensors and verify the certainty of the calculated coordinates by using the remaining vibration sensor. It is also possible to calculate the coordinates of the vibration input pen 3 by using the distances to three vibration sensors without using the distance to a vibration sensor whose distance L from the vibration input pen 3 is the longest (this is so because a long distance L decreases the detection signal level, and this increases the probability that the detection signal level is affected by noise).

In the first embodiment, four vibration sensors are installed, and the coordinates of the vibration input pen 3 are calculated by using the distances to the three vibration sensors. Geometrically, however, the coordinates of the vibration input pen 3 can be calculated by using the distances to two or more vibration sensors. Therefore, the number of vibration sensors is, of course, set in accordance with the product specifications.

Details of the vibration input pen 3 will be described below with reference to FIGS. 8, 9, and 10.

<Construction of Vibration Input Pen (FIGS. 8, 9, & 10)>

Figure 8:
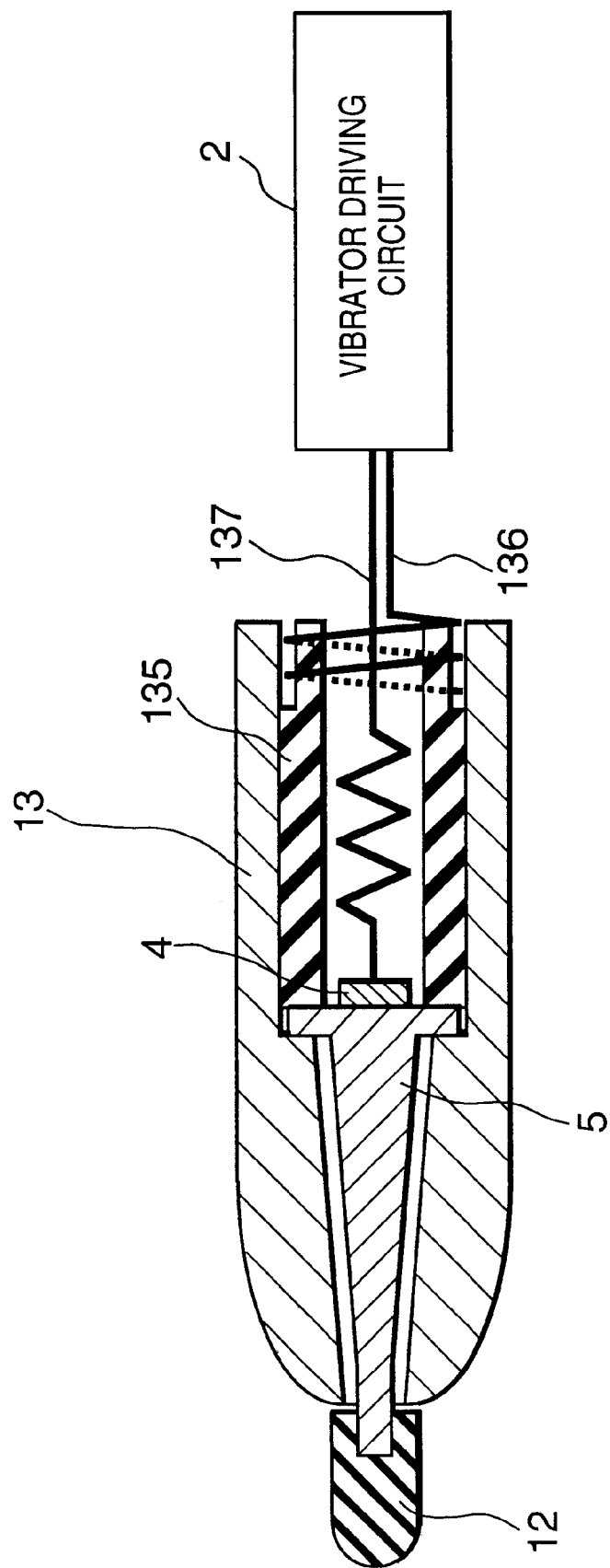
FIG. 8 is a view showing the main part of a vibration input pen according to the first embodiment of the present invention.

FIG. 8 is a view showing the major components of the vibration input pen 3 according to the first embodiment of the present invention.

Referring to FIG. 8, the built-in vibrator 4 of the vibration input pen 3 is driven by the vibrator driving circuit 2 described earlier. The vibrator 4 converts an electrical driving signal into a mechanical ultrasonic vibration and transmits the vibration to the pen tip 12 via the vibration transmitting member 5. When the pen tip 12 is brought into contact with the vibration transmitting plate 8, the vibration is applied to the vibration transmitting plate 8. In the first embodiment, the vibrator 4 is a disk-like member and uses a thickness vibration mode in which a polarization direction and a vibration direction are parallel. This vibrator 4 is attached to the large end face of the vibration transmitting member 5 by an adhering means. In this embodiment, the vibration transmitting member 5 is made of aluminum (in order to efficiently transmit vibrations, so some other metal such as stainless steel is also usable). This vibration transmitting member 5 is coaxially positioned by a conductive holder 13 and fixed by an insulating bolt 135. It is also naturally possible to improve the feeling of grip by covering the outer circumference of the holder 13 with a rubber insulator or the like.

One electrode of the vibrator 4 is connected to the vibrator driving circuit 2 via the vibration transmitting member 5, the holder 13, and an electrode spring B 137. The other electrode is connected to the vibrator driving circuit 2 via an electrode spring A 136.

The end portion of the vibration transmitting member 5 is a circular cylinder with a radius R2, and the point of the cylinder has a semispherical shape with the radius R2. The point of the pen tip 12 has a closed cap-like shape having a semispherical cavity bottom with a radius R1. In this embodiment, the material of the pen tip 12 is NBR (acrylonitrilebutadiene rubber). The radius R2 of the point of the vibration transmitting member 5 and the radius R1 of the cavity bottom of the pen tip 12 satisfy $$R1 < R2 \quad (16)$$

Hence, when the vibration transmitting member 5 is pressed into the rubber pen tip 12, the pen tip 12 readily deforms, and these two members are integrated by this elastic force. FIGS. 9 and 10 are an enlarged view of the tip and a view showing the attached state, respectively. As shown in FIGS. 9 and 10, when the vibration transmitting member 5 is pressed into the pen tip 12, the cavity bottom radius R1 of the pen tip 12 changes to R2 by elastic deformation, and the contact surfaces of these two members are kept in tight contact. Therefore, a vibration propagating in the vibration transmitting member 5 can be stably transmitted to the pen tip 12. In the first embodiment, NBR is used as the material of the pen tip 12. However, it is also possible to use another material which causes large elastic deformation, e.g., a rubber material such as CR (chloroprene rubber) or IIR (butyl rubber), or an elastomer such as a styrene-, olefin-, urethane-, polyester-, polyamide-, or vinyl chloride-based elastomer. Such rubber or elastomer materials have smaller Young's moduli than those of other materials and very unique elasticity, i.e., so-called rubber-like elasticity.

Generally, these substances are used as vibration insulators because they are very disadvantageous in transmitting acoustic waves because of their large absorption of waves. Accordingly, the thickness of the pen tip 12 used in the present invention must be well considered.

In this embodiment, the thickness is approximately 0.5 to 2 mm. On the other hand, these substances have small Young's moduli and hence can readily deform. Therefore, the pen tip 12 and the vibration transmitting member 5 can be easily adhered by pressing the latter into the former. To bring them into tight contact is very advantageous in transmitting vibrations between the two members. In this respect, these substances are preferable materials. The vibration input pen 3 of the present invention practiced by well taking account of the thickness of the pen tip 12 and the tight contact between the two members can input, to the vibration transmitting plate 8, vibrations three to five times as large as those input by a conventional input pen shown in FIG. 20 under the same conditions. This allows transmission and input of stable vibrations.

In the first embodiment as described above, when it is necessary to replace the pen tip 12 because the pen tip 12 wears or breaks in actual use, another pen tip 12 can be easily attached to the vibration transmitting member 5 by using the rubber-like elasticity of the pen tip 12. That is, the vibration input pen 3 which is easy to maintain by a user can be provided. In addition to this advantage, during the replacement the pen tip 12 and the vibration transmitting member 5 are naturally brought into tight contact, so vibrations propagating in the vibration transmitting member 5 can be efficiently and stably transmitted to the pen tip 12. That is, even when a user replaces the pen tip 12 with another, the vibration characteristics of the vibration input pen 3 remain unchanged, so stable vibrations can be applied to the vibration transmitting plate 8. Consequently, accurate input of coordinates can be permanently ensured.

Also, to further improve the feeling of operation in actual use, the surface of the NBR pen tip 12 of the first embodiment, which is brought into contact with the vibration transmitting plate 8, is subjected to a surface treatment to reduce its frictional resistance. This alleviates a kind of "unsmoothness" of the pen during writing and thereby improves the operability. Additionally, the pen tip easily deforms because its material causes large elastic deformation. Therefore, even when the vibration transmitting plate 8 as an input surface is made of a hard material such as glass, a user does not feel a kind of "hardness" during input (i.e., no shock is transmitted to the user's hand). Accordingly, a pen which does not easily tire its user can be realized.

Moreover, practicing the above arrangement can also achieve a startling effect to be described below.

As described previously, the basic principle of the coordinate input apparatus of the present invention is to use a lamb wave as a detection wave and first calculate the distances from the vibration generation source to the individual vibration sensors by measuring the group delay time tg pertaining to the group velocity Vg and the phase delay time tp pertaining to the phase velocity Vp. Equations (1) to (3) are used to calculate the distances, and equation (5) is used as a necessary condition for the use of these equations.

Figure 11:
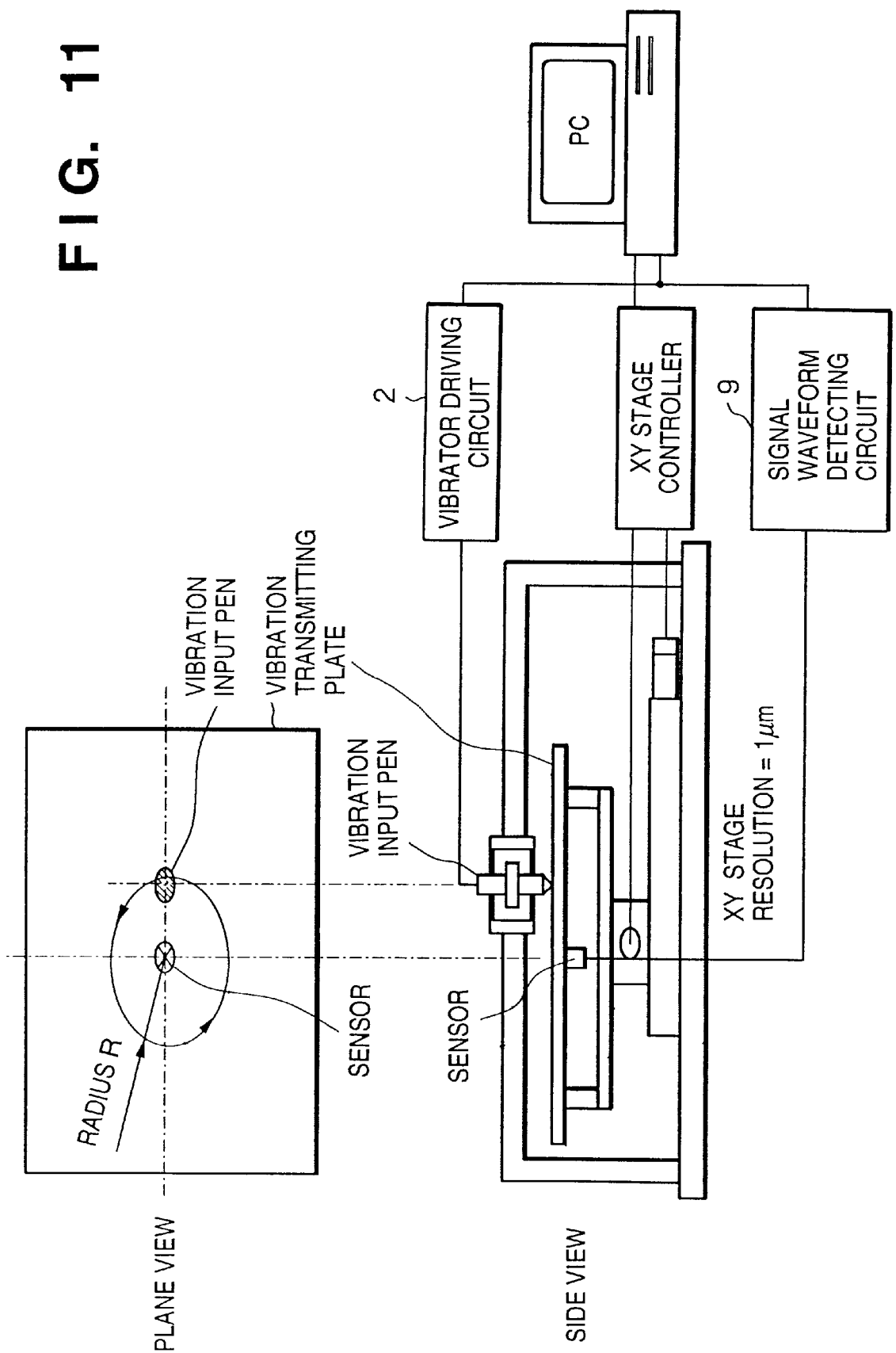
FIG. 11 is a view showing an outline of the arrangement of a measuring device for measuring directivity in the first embodiment of the present invention.

In consideration of the above respects, a measuring device shown in FIG. 11 was used to measure vibrations generated from the vibration input pen 3. This measuring device determines the behavior of a vibration generated from the vibration input pen 3 when the vibration propagates in the form of a wave around the vibration input point.

A measuring method using this measuring device will be described in detail below. A sensor is placed in the center of the vibration transmitting plate 8, and the vibration input pen 3 is circularly scanned with a fixed distance around the position of the sensor. While being rotated once around the sensor, the vibration input pen 3 is driven 360 times at equal intervals. Signals sensed by the sensor are processed by using the processing circuits such as the arithmetic and control circuit 1 in the above embodiment to detect the group delay time tg and the phase delay time tp at each measurement point (these delay times are measured for each 1°. From the group delay time tg and the phase delay time tp obtained at each measurement point, 360 integer calculation errors $\Delta N$ represented by equation (5) are obtained whenever the vibration input pen 3 rotates once. The difference between maximum and minimum values of these integer calculation errors $\Delta N$ was defined as a numerical value indicating the directivity of the vibration input pen 3 when the vibration input pen 3 rotated once. The measurement was repeatedly performed by attaching different types of pen tip samples to the vibration input pen 3.

Figure 20:
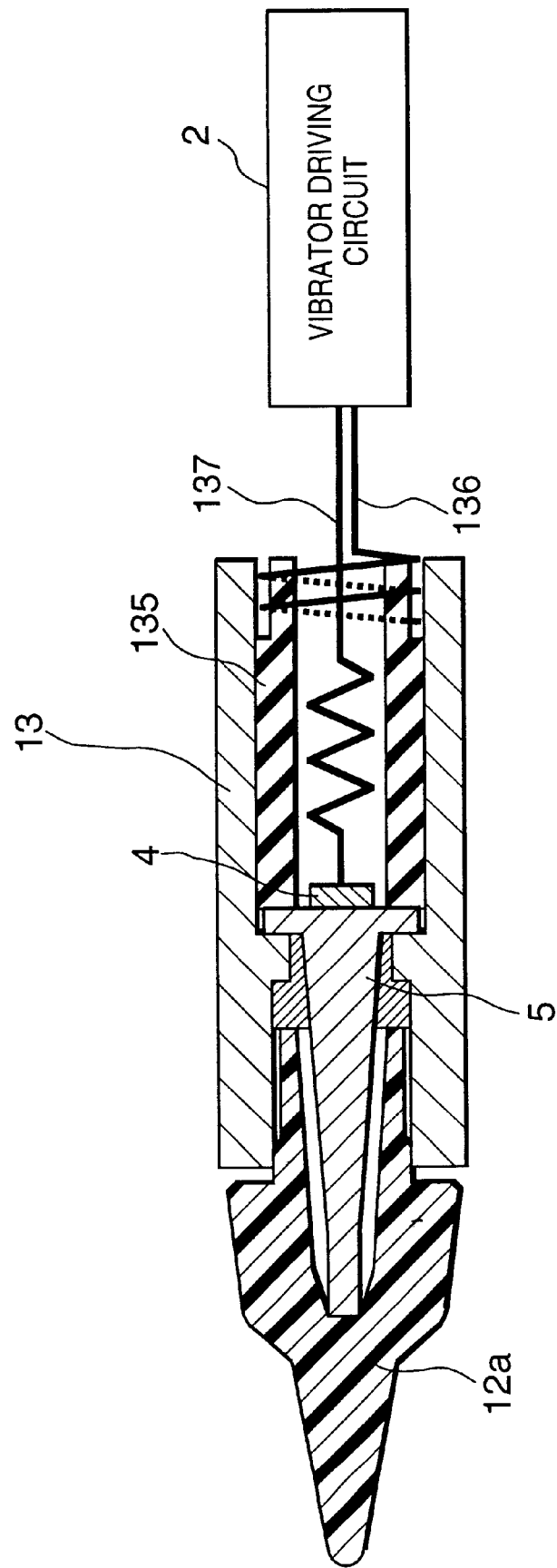
FIG. 20 is a view showing the structure of a vibration input pen according to a prior art.

The materials of the pen tip 12 of the vibration input pen 3 as an object of measurement were polyamidoimide (to be referred to as PAI hereinafter), a liquid-crystal polymer (to be referred to as LCP hereinafter), both of which are conventionally used materials, and NBR used in this embodiment. FIG. 20 shows a conventional pen tip and pen structure using a PAI pen tip and an LCP pen tip.

PAI and LCP were chosen because they can transmit vibrations generated by the vibrator 4 and do not damage the vibration transmitting plate 8 as an input surface when coordinates are input. The processing conditions of these sample were as follows.

1) The shape of a pen tip 12a was formed by mechanical processing from a PAI round rod obtained by extrusion molding.

2) The material was molded by using a mold having the same shape as the pen tip 12a (PAI).

3) The material was molded by using a mold having the same shape as the pen tip 12a (LCP).

4) The pen tip 12 of the present invention was used.

Note that the vibration transmitting member 5, the vibrator 4, the vibrator driving circuit 2, and the like of the conventional vibration input pen are the same as the vibration input pen 3 of the present invention except for the structure of the pen tip. Table 1 shows the results of measurements of the directivity performed for the samples by using the above measuring device.

Measurements were performed by repeatedly attaching and detaching the pen tip 12a or the pen tip 12 of each sample. Table 1 shows the average value and worst value of the measured directivity. "Mechanical processing" shown in Table 1 indicates extrusion molding of a polyamidoimide round rod.

TABLE 1

| Pen tip | | Directivity | | |
|---|---|---|---|---|
| | Material | Method of Manufacture | Average Value | Worst Value |
| Prior Art | PAI | mechanical processing | 0.220 | 0.340 |
| | PAI | molding | 0.120 | 0.190 |
| | LCP | molding | 0.082 | 0.190 |
| First Embodiment | NBR | molding | 0.025 | 0.047 |

As is apparent from Table 1, the directivity of the pen tip 12 of the present invention is far smaller than that of the conventional pen tip 12a.

The integer calculation error ΔN (allowable value 0.5) is produced not only by the directivity as shown in Table 1 but also by the nonlinearity of the group delay time tg with respect to the distance or noise. Therefore, minimizing the directivity improves the reliability of the apparatus. Consequently, an enough margin can be assured for an allowable value of 0.5 (detection error occurs if the value exceeds 0.5) of the integer calculation error ΔN. Specifications having this margin naturally allow easy management of the manufacture and greatly reduce the number of steps of inspection and the like.

Furthermore, improving the directivity eliminates deformation of a waveform resulting from the direction of the vibration input pen 3 as described earlier. Accordingly, coordinates can be accurately calculated regardless of the direction of the vibration input pen 3. This is obvious from the above explanation.

Figure 12:
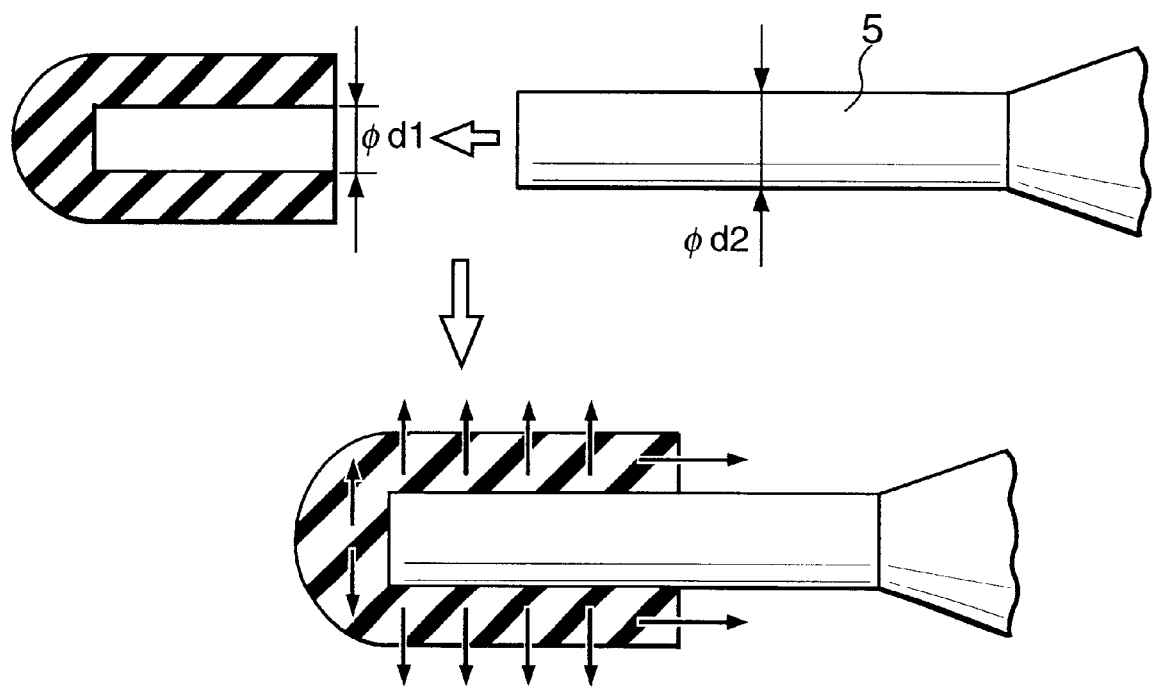
FIG. 12 is a view showing the shape of a pen tip according to a modification of the first embodiment of the present invention.
Figure 13:
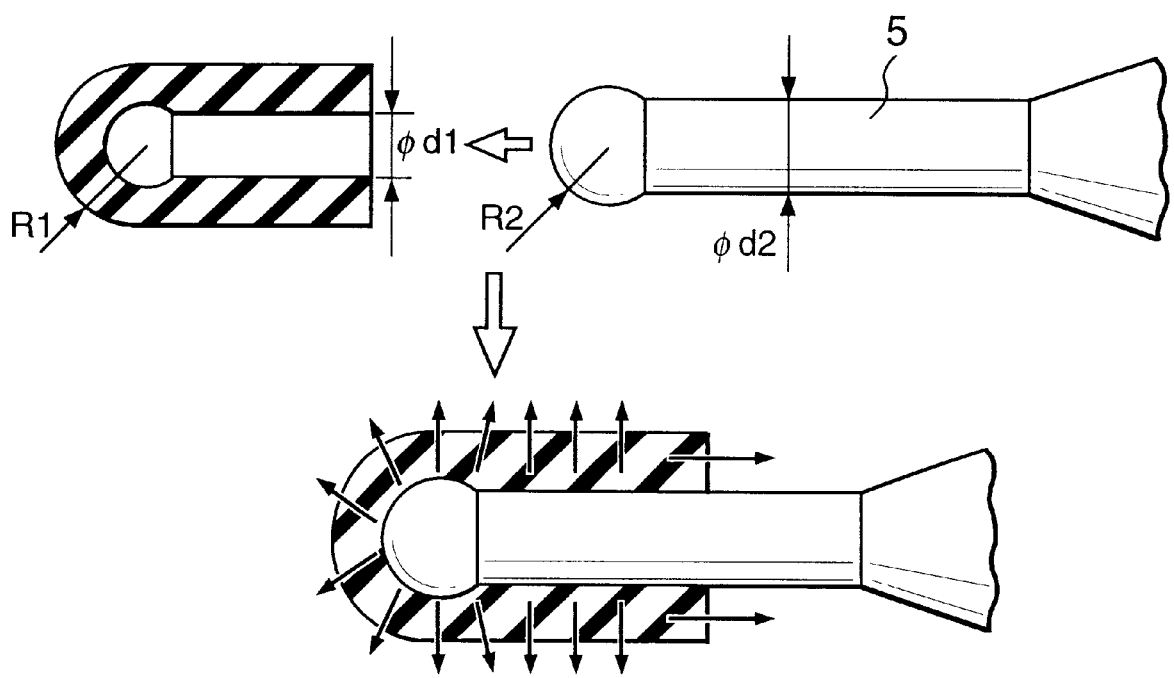
FIG. 13 is a view showing the shape of a pen tip according to another modification of the first embodiment of the present invention.

Constructions shown in FIGS. 12 and 13 are possible as modifications of the first embodiment. Referring to FIG. 12, when the point of the vibration transmitting member 5 is flattened, the dimensions of the pent tip 12 and the vibration transmitting member 5 satisfy $$\phi d1 < \phi d2 \quad (17)$$

When these two members are pressed, the pen tip 12 is attached by using its rubber-like elasticity. Consequently, the pen tip 12 so deforms as to expand along its axis, and this deformation closely adheres the pen tip 12 and the vibration transmitting member 5 in the end portion of the vibration transmitting member 5. Accordingly, it is possible to stably transmit vibrations and obtain the same effect as in the first embodiment.

Referring to FIG. 13, dimensions of the vibration transmitting member 5 and the pen tip 12 satisfy $$R1 < R2 \quad (18)$$

In this construction, the pen tip 12 can be fixed by the spherical point of the vibration transmitting member 5. Therefore, ϕd1 and ϕd2 can satisfy inequality (17) or substantially equal to each other, or ϕd1 can be larger than ϕd2. Even in this construction, at the point at which the pen tip 12 contacts the vibration transmitting plate 8, stable vibrations can be input from the pen tip 12 to the vibration transmitting plate 8 via the vibration transmitting member 5. Accordingly, the same effect as explained in the first embodiment can be obtained.

As described above, the vibration input pen 3 of the first embodiment does not generate any directivity. Therefore, the necessary condition (integer calculation error ΔN<0.5) of the measurement by the measuring device described above can be ensured with an enough margin. That is, it is possible not only to eliminate coordinate detection errors but also to increase the coordinate calculation accuracy of the coordinate input apparatus.

Also, a user can easily replace the pen tip 12 with another in actual use. Additionally, even this replacement by a user does not degrade the vibration characteristics of the vibration input pen 3. So, stable coordinate input can be permanently performed.

Furthermore, an elastomer such as rubber which is conventionally considered to be disadvantageous in transmitting vibrations is used as the pen tip. This improves the operability in writing and makes the vibration input pen 3 convenient to use.

As has been described above, the first embodiment can provide an input pen for a coordinate input apparatus, which can reduce its directivity and can be easily replaced.

<<Second Embodiment>>

In the second embodiment, another construction of a pen tip 12 will be described.

Figure 14:
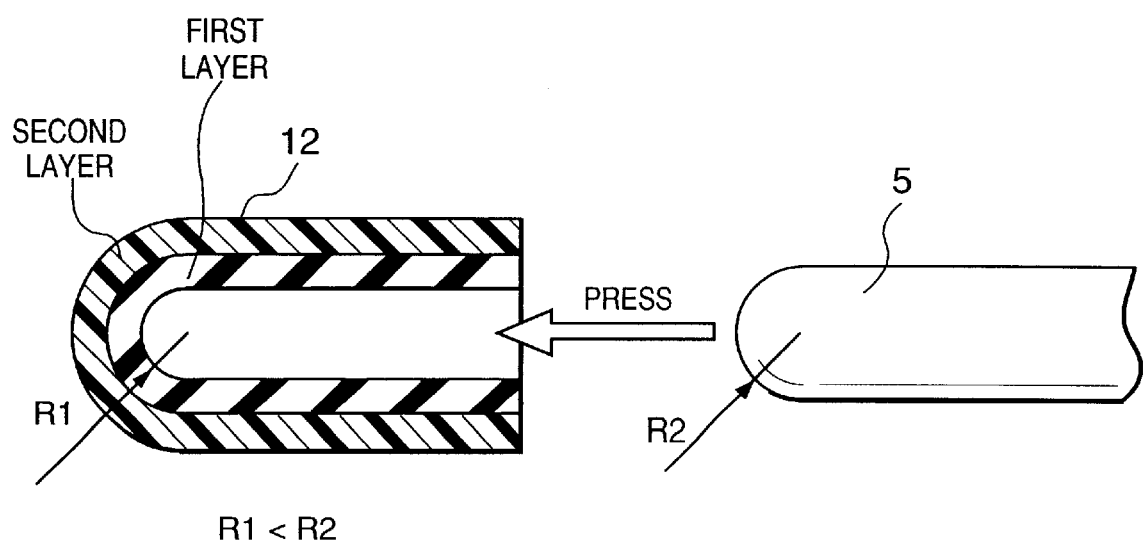
FIG. 14 is an enlarged view showing the tip of a vibration input pen according to the second embodiment of the present invention.

The end portion of a vibration transmitting member 5 is a circular cylinder with a radius R2, and the point of the cylinder has a semispherical shape with the radius R2. As shown in FIG. 14, the pen tip 12 is composed of two layers; the first layer is a member with rubber-like elasticity, and the second layer is formed on the first layer by using a resin. In this second embodiment, the first layer is made from a styrene-based thermoplastic elastomer, and the second layer is made from polypropylene. These first and second layers are integrally formed by two-color molding. The point of the pen tip 12 has a closed cap-like shape having a semispherical cavity bottom with a radius R1. The radius R2 of the point of the vibration transmitting member 5 and the radius R2 of the cavity bottom of the pen tip 12 satisfy inequality (16) presented earlier.

Figure 15:
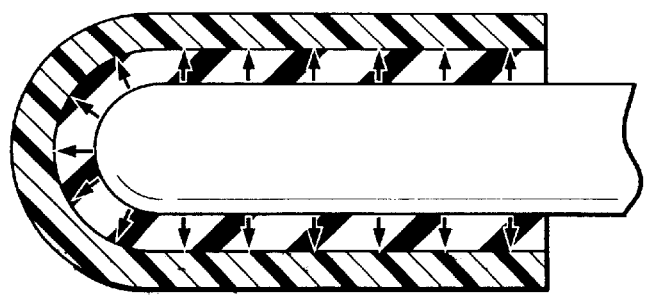
FIG. 15 is a view showing the way the tip is attached to the vibration input pen according to the second embodiment of the present invention.

Hence, when the vibration transmitting member 5 is pressed into the rubber pen tip 12, the first layer with rubber-like elasticity of the pen tip 12 readily deforms, and these two members are integrated by this elastic force. FIGS. 14 and 15 are an enlarged view of the tip and a view showing the attached state, respectively. As shown in FIGS. 14 and 15, when the vibration transmitting member 5 is pressed into the pen tip 12, the cavity bottom radius R1 of the pen tip 12 changes to R2 by elastic deformation, and the contact surfaces of these two members are brought into tight contact. Therefore, a vibration propagating in the vibration transmitting member 5 can be stably transmitted to the pen tip 12. In the second embodiment, a styrene-based thermoplastic elastomer is used as the material of the first layer of the pen tip 12. However, it is also possible to use another material which causes large elastic deformation, e.g., a rubber material such as NBR (acrylonitrilebutadiene rubber), CR (chloroprene rubber), or IIR (butyl rubber), or an elastomer such as an olefin-, urethane-, polyester-, polyamide-, or vinyl chloride-based elastomer. Such rubber or elastomer materials have smaller Young's moduli than those of other materials and very unique elasticity, i.e., so-called rubber-like elasticity.

Generally, these substances are used as vibration insulators because they are very disadvantageous in transmitting acoustic waves because of their large absorption of waves. Accordingly, the thickness of the first layer of the pen tip 12 used in the present invention must be well considered. In the second embodiment, the thickness is approximately 0.5 to 2 mm. On the other hand, these substances have small Young's moduli and hence can readily deform. Therefore, the pen tip 12 and the vibration transmitting member 5 can be easily brought into tight contact by pressing the latter into the former. To bring them into tight contact is very advantageous in transmitting vibrations between the two members. In this respect, these substances are preferable materials. A vibration input pen 3 of the present invention practiced by well taking account of the thickness of the first layer of the pen tip 12 and the tight contact between the two members can input, to a vibration transmitting plate 8, vibrations three to five times as large as those input by a conventional input pen shown in FIG. 20 under the same conditions. This allows transmission and input of stable vibrations.

As described above, an elastomer is an optimum material which allows easy attachment and detachment and can remove instability of vibration transmission even after repetitive attachment and detachment. However, the following problem arises if an elastomer member is brought into direct contact with the vibration transmitting plate 8. That is, a member having rubber-like elasticity largely deforms with small stress because its Young's modulus is small. When a member like this is used as a pen tip member, therefore, the pen tip deforms in accordance with the writing pressure of an operator, and the area in contact with the vibration transmitting plate 8 greatly changes accordingly. This not only makes fine coordinate input difficult but also decreases the resolution of coordinate calculations. Additionally, a member of this sort generally has a large friction coefficient. Therefore, when an operator continuously inputs coordinates with this member, the member makes the operator feel that the pen tip does not move smoothly. This decreases the grasping power of the operator or accumulates a sense of fatigue after long-time use. To solve these problems, a two-layered structure is used as the pen tip 12; a resin which eliminates deformation of the pen tip and has small frictional resistance and high wear resistance is formed on the first layer with rubber-like elasticity.

In the second embodiment, polypropylene is used as the second layer of the pen tip 12. However, it is possible to use any resin which has comparatively high wear resistance and does not damage the vibration transmitting plate 8. Examples are polyacetal, polyimide, polycarbonate, polyamidoimide, and ABS.

The material of the second layer is harder than the elastomer used as the first layer. This eliminates deformation of the point of the pen tip 12 during writing and allows fine coordinate input. On the other hand, since the second layer is made of a relatively hard material, an operator sometimes feels a shock during coordinate input (especially when an operator inputs coordinates at high writing speed, the operator feels a kind of "hardness", and this gives the operator a sense of incompatibility. To solve this problem, the first layer with rubber-like elasticity of the pen tip 12 functions as an absorber to realize an input pen with high operability.

In the second embodiment, the pen tip 12 with the two-layered structure is manufactured by two-color molding. However, it is also naturally possible to manufacture the two layers by adhesion (if this is the case, the pen tip has a three-layered structure including a layer of an adhesive).

The specifications of the pen tip can, of course, be such that a user can replace the pen tip when the pen tip wears by writing and this wears the resin of the second layer and exposes the elastomer of the first layer. However, the durability of the pen tip 12 can be improved by covering the pen tip with a resin.

In the second embodiment as described above, when it is necessary to replace the pen tip 12 because the pen tip 12 wears or breaks in actual use, another pen tip 12 can be easily attached to the vibration transmitting member 5 by using the rubber-like elasticity of the first layer of the pen tip 12. That is, the vibration input pen 3 which is easy to maintain by a user can be provided. In addition to this advantage, during the replacement tight contact naturally takes place between the pen tip 12 and the vibration transmitting member 5, so vibrations propagating in the vibration transmitting member 5 can be efficiently and stably transmitted to the pen tip 12. That is, even when a user replaces the pen tip 12 with another, the vibration characteristics of the vibration input pen 3 remain unchanged, so stable vibrations can be applied to the vibration transmitting plate 8. Consequently, accurate input of coordinates can be permanently ensured. Also, the two-layered structure of the pen tip 12 can provide the vibration input pen 3 with high operability.

Moreover, practicing the above arrangement can also achieve a startling effect to be described below.

As described previously, the basic principle of the coordinate input apparatus of the present invention is to use a lamb wave as a detection wave and first calculate the distances from the vibration generation source to the individual vibration sensors by measuring a group delay time tg pertaining to a group velocity Vg and a phase delay time tp pertaining to a phase velocity Vp. Equations (1) to (3) are used to calculate the distances, and equation (5) is used as a necessary condition for the use of these equations.

In consideration of the above respects, a measuring device shown in FIG. 11 was used to measure vibrations generated from the vibration input pen 3 under the same conditions as in the first embodiment.

PAI and LCP are chosen because they can transmit vibrations generated by a vibrator 4 and do not damage the vibration transmitting plate 8 as an input surface when coordinates are input. The directivity of each sample was measured by using the above measuring device (measurements were performed by repeatedly attaching and detaching the pen tip of each sample). Consequently, it was found the directivity of the pen tip of the present invention was much smaller than (¼ to ⅐) that of the conventional pen tip.

An integer calculation error $\Delta N$ (allowable value: 0.5) described previously is produced not only by the directivity as shown in Table 1 but also by the nonlinearity of the group delay time tg with respect to the distance or noise. Therefore, minimizing the directivity improves the reliability of the apparatus. Consequently, an enough margin can be assured for an allowable value of 0.5 (detection error occurs if the value exceeds 0.5) of the integer calculation error $\Delta N$. Specifications having this margin naturally allow easy management of the manufacture and greatly reduce the number of steps of inspection and the like.

Furthermore, improving the directivity eliminates deformation of a waveform resulting from the direction of the vibration input pen 3 as described earlier. Accordingly, coordinates can be accurately calculated regardless of the direction of the vibration input pen 3. This is obvious from the above explanation.

Figure 16:
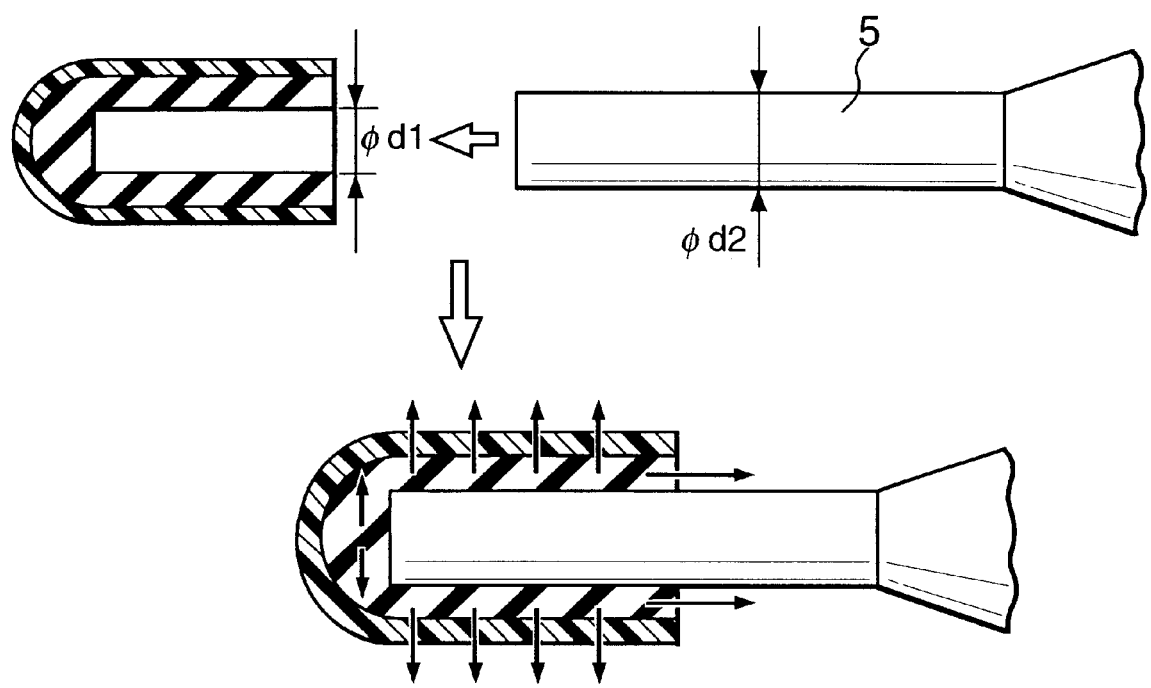
FIG. 16 is a view showing the shape of a pen tip according to a modification of the second embodiment of the present invention.
Figure 17:
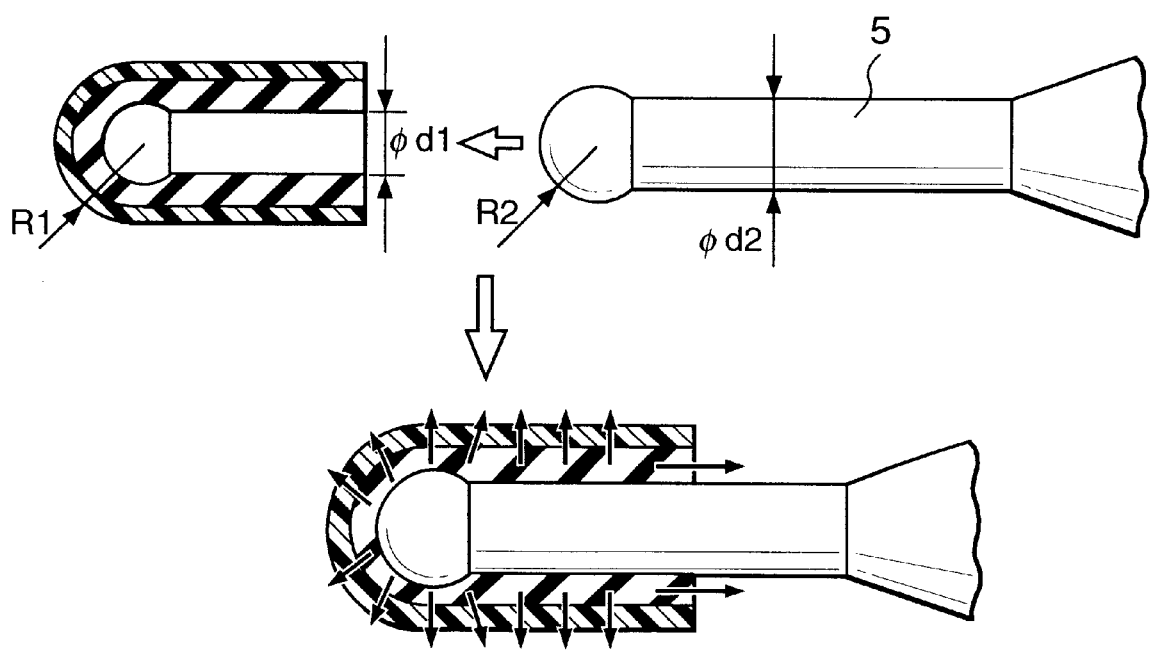
FIG. 17 is a view showing the shape of a pen tip according to another modification of the second embodiment of the present invention.

Constructions shown in FIGS. 16 and 17 are possible as modifications of the second embodiment. Referring to FIG. 16, when the point of the vibration transmitting member 5 is flattened, the dimensions of the pent tip 12 and the vibration transmitting member 5 satisfy inequality (17).

When these two members are pressed, the pen tip 12 is attached by using the rubber-like elasticity of its first layer. Consequently, the pen tip 12 so deforms as to expand along its axis, and this deformation allows the pen tip 12 and the vibration transmitting member 5 to tightly contact in the end portion of the vibration transmitting member 5. Accordingly, it is possible to stably transmit vibrations and obtain the same effect as in the first embodiment.

Referring to FIG. 17, dimensions of the vibration transmitting member 5 and the pen tip 12 satisfy inequality (18).

In this construction, the pen tip 12 can be fixed by the spherical point of the vibration transmitting member 5. Therefore, ød1 and ød2 can satisfy inequality (17) or substantially equal to each other, of ød1 can be larger than ød2. Even in this construction, at the point at which the pen tip 12 contacts the vibration transmitting plate 8, stable vibrations can be input from the pen tip 12 to the vibration transmitting plate 8 via the vibration transmitting member 5. Accordingly, the same effect as explained in the first embodiment can be obtained.

Figure 18:
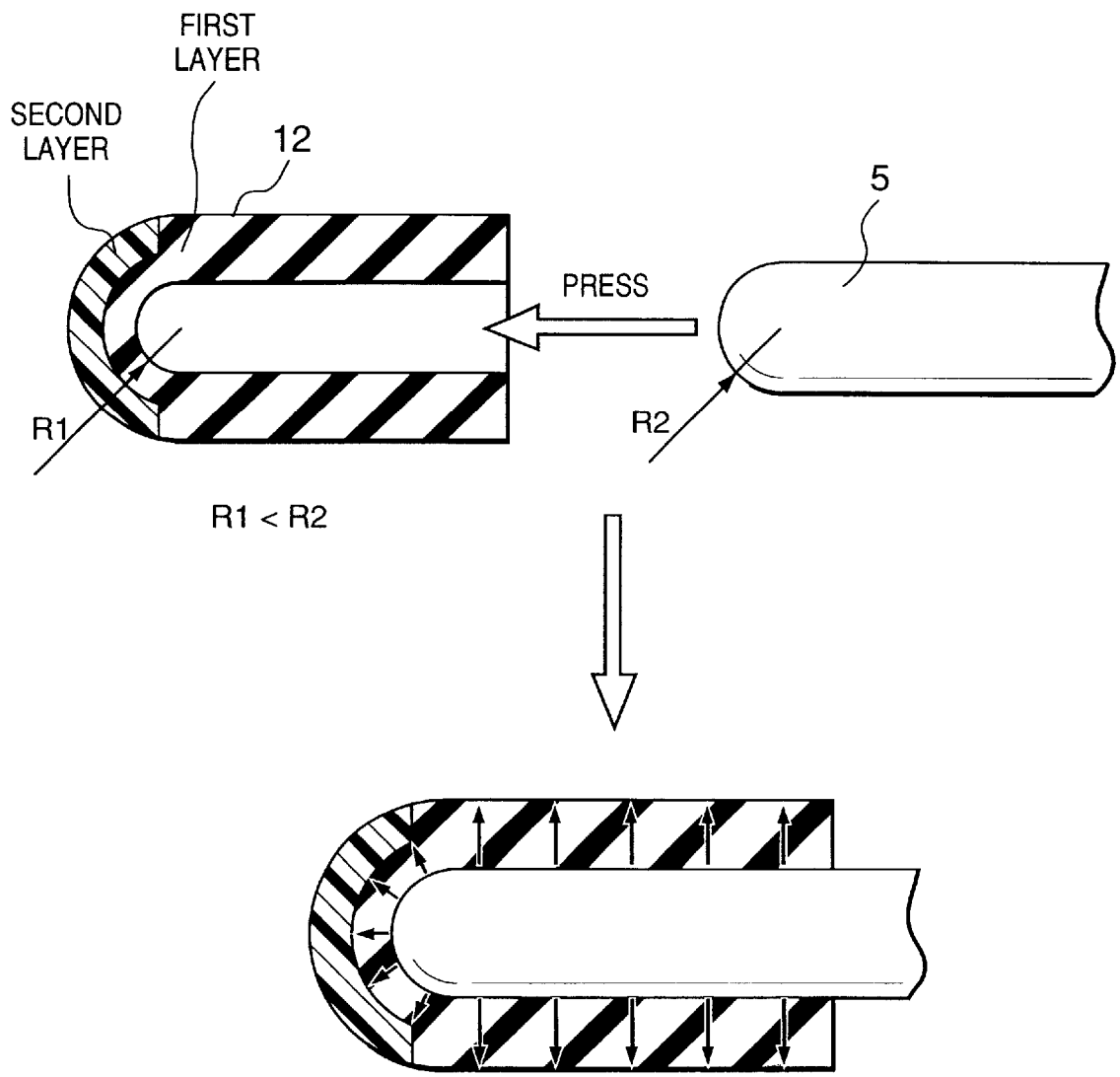
FIG. 18 is a view showing the shape of a pen tip according to still another modification of the second embodiment of the present invention.
Figure 19:
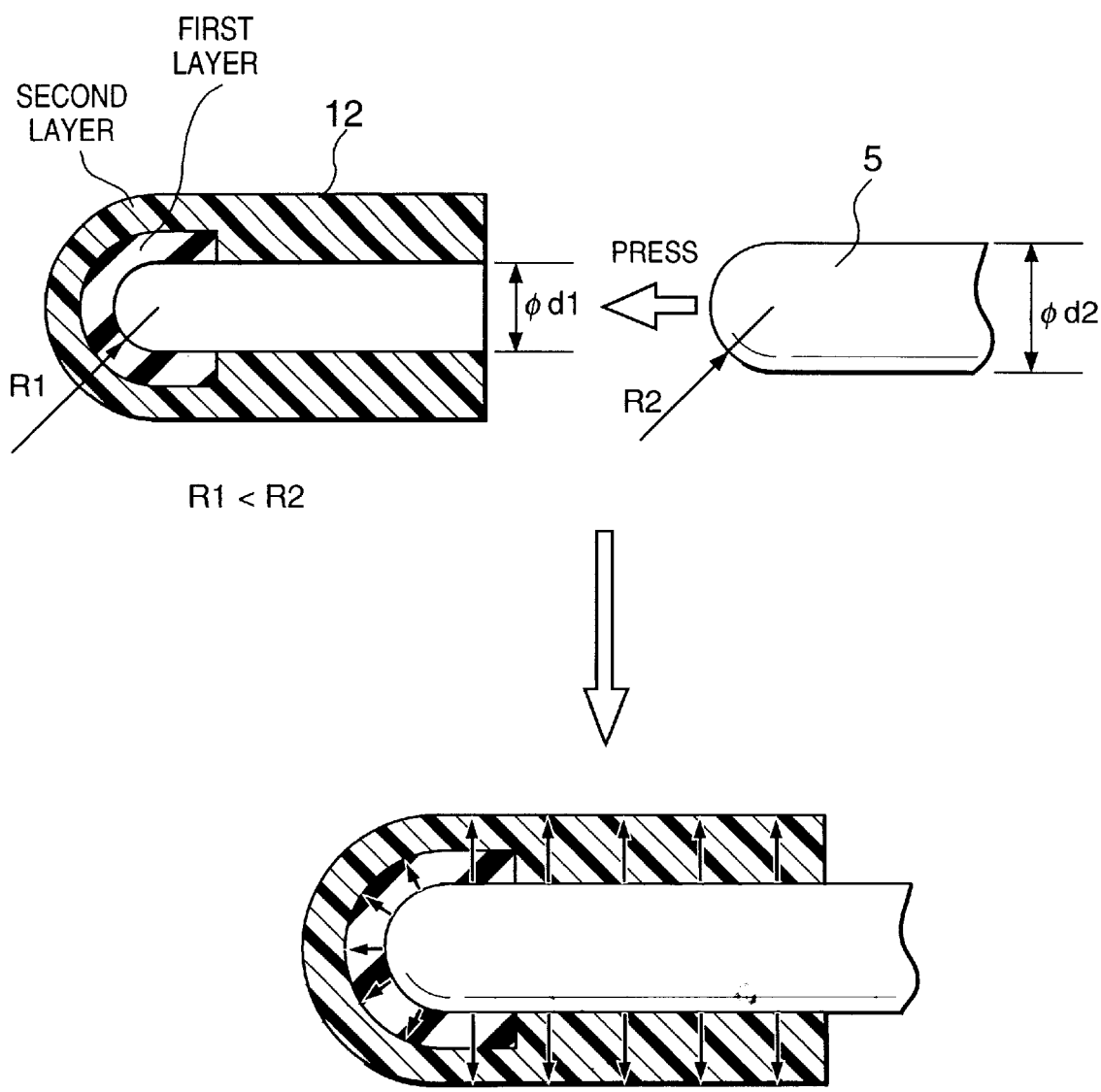
FIG. 19 is a view showing the shape of a pen tip according to still another modification of the second embodiment of the present invention.

As shown in FIG. 18, a layered structure can be formed only in a portion (the point of the pen tip 12) in which the pen tip 12 and the vibration transmitting plate 8 actually contact each other during coordinate input. A structure as shown in FIG. 19 is also possible. Referring to FIG. 19, the first layer having rubber-like elasticity exists only in the point of the pen tip 12 which contacts the vibration transmitting member 5. The rest of the pen tip 12 is constructed of the second layer, and inequality (17) is met. When the vibration transmitting member 5 is pressed into the pen tip 12, the second layer elastically deforms, and the pen tip 12 is detachably fixed to the vibration transmitting member 5. Since the first layer readily deforms by its rubber-like elasticity, the contact surfaces of the pen tip 12 and the vibration transmitting member 5 are brought into tight contact in this portion. Accordingly, the same effect as explained in the first embodiment can be obtained.

As described above, the vibration input pen 3 of the first embodiment does not generate any directivity. Therefore, the necessary condition (integer calculation error $\Delta N < 0.5$) of the measurement by the measuring device described above can be ensured with an enough margin. That is, it is possible not only to eliminate coordinate detection errors but also to increase the coordinate calculation accuracy of the coordinate input apparatus.

Also, a user can easily replace the pen tip 12 with another in actual use. Additionally, even this replacement by a user does not degrade the vibration characteristics of the vibration input pen 3. So, stable coordinate input can be permanently performed.

Furthermore, it is possible to improve the durability of the pen tip 12 and the operability in writing and thereby make the vibration input pen 3 convenient to use.

The present invention can be applied to a system constituted by a plurality of devices (e.g., host computer, interface, reader, and printer) or to an apparatus (e.g., copying machine or facsimile) comprising a single device.

As many apparently widely different embodiments of the present invention can be made without departing from the spirit and scope thereof, it is to be understood that the invention is not limited to the specific embodiments thereof except as defined in the appended claims.

What is claimed is:

1. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element;

a pen tip member attached to a point of said vibration transmitting member and made of a material having viscoelasticity, wherein said vibration transmitting member has a semispherical point, said pen tip member has a semispherical cavity bottom, and the radius of the cavity bottom is smaller than a radius of the point.

2. The pen according to claim 1, wherein the material having viscoelasticity is acrylonitrilebutadiene rubber.

3. The pen according to claim 1, wherein the material having viscoelasticity is one material selected from the group consisting of rubber materials such as chloroprene rubber and butyl rubber, elastomers such as styrene-, olefin-, urethane-, polyester-, polyamide-, and vinyl chloride-based elastomers, and a combination thereof.

4. The pen according to claim 1, wherein a surface of said pen tip member is so treated as to decrease frictional resistance against said vibration transmitting plate.

5. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element;

a pen tip member attached to a point of said vibration transmitting member and made of a material having viscoelasticity; and a thickness of said pen tip member is 0.5 to 2 mm.

6. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element;

a pen tip member attached to a point of said vibration transmitting member and made of a material having viscoelasticity, wherein said vibration transmitting member has a plane point, said pen tip member has a plane cavity bottom, and a radius of the cavity bottom is smaller than a radius of the point.

7. The pen according to claim 6, wherein the material having viscoelasticity is acrylonitrilebutadiene rubber.

8. The pen according to claim 6, wherein the material having viscoelasticity is one material selected from the group consisting of rubber materials such as chloroprene rubber and butyl rubber, elastomers such as styrene-, olefin-, urethane-, polyester-, polyamide-, and vinyl chloride-based elastomers, and a combination thereof.

9. The pen according to claim 6, wherein a surface of said pen tip member is so treated as to decrease frictional resistance against said vibration transmitting plate.

10. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element;

a pen tip member attached to a point of said vibration transmitting member and made of a material having viscoelasticity, wherein said vibration transmitting member has a spherical point, said pen tip member has a spherical cavity bottom, and a radius of the cavity bottom is smaller than a radius of the point.

11. The pen according to claim 10, wherein the material having viscoelasticity is acrylonitrilebutadiene rubber.

12. The pen according to claim 10, wherein the material having viscoelasticity is one material selected from the group consisting of rubber materials such as chloroprene rubber and butyl rubber, elastomers such as styrene-, olefin-, urethane-, polyester-, polyamide-, and vinyl chloride-based elastomers, and a combination thereof.

13. The pen according to claim 10, wherein a surface of said pen tip member is so treated as to decrease frictional resistance against said vibration transmitting plate.

14. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element;

a pen tip member attached to a point of said vibration transmitting member and made of a material having viscoelasticity; and said pen tip is detachable.

15. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said vibration transmitting member has a semispherical point, said first layer of said pen tip member has a semispherical cavity bottom, and a radius of the cavity bottom is smaller than a radius of the point.

16. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein the thickness of said first layer is 0.5 to 2 mm.

17. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said vibration transmitting member has a plane point, said first layer of said pen tip member has a plane cavity bottom, and a radius of the cavity bottom is smaller than a radius of the point.

18. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said vibration transmitting member has a spherical cavity bottom, and a radius of the cavity bottom is smaller than a radius of the point.

19. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said second layer is so molded as to form a semispherical shape on a point of said first layer.

20. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said first layer is so molded as to form a semispherical shape in a cavity bottom of said second layer.

21. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said pen tip member is manufactured by two-color molding.

22. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said first and second layers are adhered by an adhesive.

23. An input pen for a coordinate input apparatus for determining an input position on the basis of a vibration propagating on a vibration transmitting plate comprising:

a vibration generating element for generating a vibration;

a vibration transmitting member for transmitting the vibration generated by said vibration generating element; and a pen tip member attached to a point of said vibration transmitting member and having a molded layered structure including a first layer made of a material having viscoelasticity and a second layer formed on said first layer by using a resin material, wherein said pen tip member is detachable.

* * * * *

UNITED STATES PATENT AND TRADEMARK OFFICE
CERTIFICATE OF CORRECTION

PATENT NO. : 6,384,814 B1
DATED : May 7, 2002
INVENTOR(S) : Katsuyuki Kobayashi et al.

It is certified that error appears in the above-identified patent and that said Letters Patent is hereby corrected as shown below:

Column 1,
Line 39, "not only" should be deleted.

Column 5,
Line 21, "A" should read -- $\lambda$ --.

Column 7,
Line 18, "agate" should read -- a gate --.

Column 12,
Line 22, "1°." should read -- 1°). --.

Column 13,
Line 22, "an enough" should read -- a sufficient --.
Line 37, "pent" should read -- pen --.
Line 56, "or" should read -- or be --.

Column 14,
Line 1, "an enough" should read -- a sufficient --.
Line 33, "R2" should read -- R1 --.

Column 16,
Line 46, "an enough" should read -- a sufficient --.

Column 17,
Line 8, "or" should read -- or be --.
Line 9, "of" should read -- or --.
Line 35, "an enough" should read -- a sufficient --.

Column 18,
Line 27, "and" should read -- wherein --.

UNITED STATES PATENT AND TRADEMARK OFFICE
CERTIFICATE OF CORRECTION

PATENT NO.    : 6,384,814 B1
DATED         : May 7, 2002
INVENTOR(S)   : Katsuyuki Kobayashi et al.

It is certified that error appears in the above-identified patent and that said Letters Patent is hereby corrected as shown below:

<u>Column 19,</u>
Line 26, "and" should read -- wherein --.

Signed and Sealed this

Twenty-second Day of July, 2003

JAMES E. ROGAN
*Director of the United States Patent and Trademark Office*